United States Patent
Yang et al.

(10) Patent No.: US 12,423,463 B2
(45) Date of Patent: Sep. 23, 2025

(54) DATA PROCESSING FOR RELEASE WHILE PROTECTING INDIVIDUAL PRIVACY

(71) Applicant: Lemon Inc., Grand Cayman (KY)

(72) Inventors: Xin Yang, Los Angeles, CA (US);
Yuanshun Yao, Los Angeles, CA (US);
Tianyi Liu, Los Angeles, CA (US);
Jiankai Sun, Los Angeles, CA (US);
Chong Wang, Los Angeles, CA (US);
Ruihan Wu, Los Angeles, CA (US)

(73) Assignee: LEMON INC., Grand Cayman (KY)

(\*) Notice: Subject to any disclaimer, the term of this patent is extended or adjusted under 35 U.S.C. 154(b) by 858 days.

(21) Appl. No.: 17/535,398

(22) Filed: Nov. 24, 2021

(65) Prior Publication Data
US 2023/0161899 A1 May 25, 2023

(51) Int. Cl.
*G06F 21/62* (2013.01)

(52) U.S. Cl.
CPC .............................. *G06F 21/6245* (2013.01)

(58) Field of Classification Search
CPC ......................... G06F 21/6245; G06F 21/6254
See application file for complete search history.

(56) References Cited

U.S. PATENT DOCUMENTS

| | | | | |
|---|---|---|---|---|
| 2017/0024575 | A1* | 1/2017 | Heckel | G06F 21/6245 |
| 2017/0337487 | A1* | 11/2017 | Nock | G06N 20/00 |
| 2017/0353855 | A1* | 12/2017 | Joy | H04W 12/02 |
| 2018/0018590 | A1* | 1/2018 | Szeto | G16H 10/60 |
| 2020/0012902 | A1* | 1/2020 | Walters | G06F 18/23 |
| 2020/0034566 | A1* | 1/2020 | Zhang | G06Q 50/01 |
| 2020/0394320 | A1* | 12/2020 | Bernau | G06N 3/047 |
| 2021/0012028 | A1* | 1/2021 | Cabot | G06F 17/18 |

FOREIGN PATENT DOCUMENTS

| | | |
|---|---|---|
| CN | 103476040 A | 12/2013 |
| CN | 110727957 A | 1/2020 |
| JP | 2018-061091 A | 4/2018 |

OTHER PUBLICATIONS

Wang et al., "An Experimental Study of Matrix-Based Data Distortion Methods", Dec. 2010, International Conference on Computational and Information Sciences, pp. 952-955 (Year: 2010).*

International Patent Application No. PCT/SG2022/050739; Int'l Search Report and the Written Opinion; dated Jun. 21, 2023; 11 pages.

Lee et al.; "Synthesizing Differentially Private Datasets using Random Mixing"; IEEE Int'l Symposium on Information Theory; 2019; p. 542-546.

(Continued)

*Primary Examiner* — Kenneth W Chang
(74) *Attorney, Agent, or Firm* — BakerHostetler

(57) ABSTRACT

The present disclosure describes techniques of releasing data while protecting individual privacy. A dataset may be compressed by applying a first random matrix. The dataset may be owned by a party among a plurality of parties and there may be a plurality of datasets owned by the plurality of parties. A noise may be added by applying a random Gaussian matrix to the compressed dataset to obtain a processed dataset. The processed dataset ensures data privacy protection. The processed dataset may be released to other parties.

15 Claims, 10 Drawing Sheets

(56) References Cited

OTHER PUBLICATIONS

Hall et al.; "Secure Multiple Linear Regression Based on Homomorphic Encryption"; Journal of Official Statistics; vol. 27 No. 4; 2011; p. 669-691.
Cynthia Dwork; "A firm foundation for private data analysis"; Communications of the ACM; vol. 54 No.1; Jan. 2011; p. 86-95.
Johnson et al.; Extensions of Lipschitz mappings into a Hilbert space; Contemporary Mathematics; vol. 26; 1984; p. 189-206.
Chapelle et al.; "Yahoo! Learning to Rank Challenge Overview"; Proceedings of the Learning to Rank Challenge; vol. 14; 2011; 24 pages.
Real et al.; "YouTube-BoundingBoxes: A Large High-Precision Human-Annotated Data Set for Object Detection in Video"; IEEE Conf. on Computer Vision and Pattern Recognition; 2017; p. 5296-5305.
Fast et al.; "Long-Term Trends in the Public Perception of Artificial Intelligence": $31^{st}$ AAAI Conf. on Artificial Intelligence; vol. 31; 2017; p. 963-969.
Kong et al.; "GiantMIDI-Piano: A large-scale MIDI dataset for classical piano music"; Information Retrieval; arXiv:2010.07061; 2020; 11 pages.
Rob Bonta; "California Consumer Privacy Act (CCPA)"; https://https://oag.ca.gov/privacy/ccpa; 2018; accessed Feb. 2, 2022; 11 pages.
"Health Insurance Portability and Accountability ACTOF1996"; Public Law 104-191; https://www.govinfo.gov/app/details/PLAW-104publ191; U.S. Government; Aug. 1996; access Feb. 3, 2022; 2 pages.
"Regulation (EU) 2016/679 of the European Parliament and of the Council of Apr. 27, 2016"; https://cnpd.public.lu/en/legislation/droit-europ/union-europeene/rgpd.html; accessed Feb. 2, 2022; 6 pages.
Dwork et al.; "Calibrating Noise to Sensitivity in Private Data Analysis"; Theory of Cryptography Conf.; 2006; p. 265-284.
Dwork et al.; "The Algorithmic Foundations of Differential Privacy"; Foundations and Trends in Theoretical Computer Science; vol. 9; 2014; 281 pages.
Or Sheffet; "Differentially Private Ordinary Least Squares"; $34^{th}$ Int'l Conf. on Machine Learning; 2017; 28 pages.
Lee et al.; "Synthesizing Differentially Private Datasets using Random Mixing"; IEEE Int'l Symposium on Information Theory; 2019; p. 542-546 (abstract only).
Xu et al.; "DPPro: Differentially Private High-Dimensional Data Release via Random Projection"; IEEE Transactions on Information Forensics and Security; vol. 12; 2017; p. 3081-3093.
Kenthapadi et al.; "Privacy via the Johnson-Lindenstrauss Transform"; Data Structures and Algorithms; arXiv:1204.2606; 2012; 24 pages.
Johnson et al.; "Extension of Lipschitz Mappings Into A Hilbert Space"; Contemporary Mathematics; vol. 26; 1984; p. 189-206.
Dimitris Achlioptas; "Database-friendly random projections: Johnson-Lindenstrauss with Binary Coins"; Journal of Computer and System Sciences; vol. 66; Jun. 2003; p. 671-687.
Farrar et al.; "Multicollinearity In Regression Analysis: The Problem Revisited"; The Review of Economic and Statistics; 1967; p. 92-107.
"UCI Machine Learning Repository"; https://archive.ics.uci.edu/ml/index.php; accessed Feb. 3, 2022; 2 pages.
Fanaee-T et al.; "Event labeling combining ensemble detectors and background knowledge"; Process in Artificial Intelligence; vol. 2; 2014; p. 113-127.
Hamidieh et al.; "A data-driven statistical model for predicting the critical temperature of a superconductor"; Computational Materials Science; vol. 154; 2018; 24 pages.
Ballester-Ripoll et al.; "Sobol tensor trains for global sensitivity analysis"; Reliability Engineering & System Safety; vol. 183; 2019; 16 pages.
Nugteren et al.; "CLTune: A generic auto-tuner for OpenCL kernels"; IEEE $9^{th}$ Int'l Symposium in Embedded Multicore/Manycore Systems-on-Chip; 2015; p. 195-202.
Bertin-Mahieux et al.; "The Million Song Dataset"; $12^{th}$ Int'l Conf. on Music Information Retrieval; 2011; 6 pages.
Gondara et al.; "Differentially Private Small Dataset Release Using Random Projections"; $36^{th}$ Conf. on Uncertainty in Artificial Intelligence; vol. 124; 2020; p. 639-648.
Xie et al.; "Differentially Private Generative Adversarial Network"; Machine Learning; arXiv:1802.06739; 2018; 9 pages.
Jordon et al.; "PATE-GAN: Generating Synthetic Data with Differential Privacy Guarantees"; Int'l Conf. on Learning Representations; 2018; 21 pages.
Bassily et al.; "Private Empirical Risk Minimization: Efficient Algorithms and Tight Error Bounds"; IEEE $55^{th}$ Annual Symposium on Foundations of Computer Science; 2014; 39 pages.
Bassily et al.; "Private Stochastic Convex Optimization with Optimal Rates": Advances in Neural Information Processing Systems 32; 2019; 10 pages.
Feldman et al.; "Private stochastic convex optimization: optimal rates in linear time": $52^{nd}$ Annual ACM SIGACT Symposium on Theory of Computing; 2020; p. 439-449.
Kasiviswanathan et al.; "What Can We Learn Privately?"; SIAM Journal on Computing; vol. 40; 2011; p. 793-826.
Chaudhuri et al.; "Convergence Rates for Differentially Private Statistical Estimation"; Int'l Conf. on Machine Learning; vol. 2012; 2012; p. 1327-1334.
Nikolaenko et al.; "Privacy-Preserving Ridge Regression on Hundreds of Millions of Records"; IEEE Symposium on Security and Privacy; 2013; p. 334-348.
Gascon et al.; "Privacy-Preserving Distributed Linear Regression on High-Dimensional Data"; Proceedings on Privacy Enhancing Technologies; vol. 4; 2017; p. 345-364.

* cited by examiner

| Dataset | Stat. | OLS | c = 1 | | | c = 3 | | | c = 10 | | |
|---|---|---|---|---|---|---|---|---|---|---|---|
| | | | BGM | DGM | RMGM | BGM | DGM | RMGM | BGM | DGM | RMGM |
| Bike | $n = 13003, d = 13$ | 0.017 | 0.072 | 0.657 | 0.060 | 0.066 | 0.677 | 0.061 | 0.059 | 0.508 | 0.029 |
| Superconductor | $n = 17010, d = 81$ | 0.009 | 0.067 | 1.240 | 0.262 | 0.060 | 0.708 | 0.069 | 0.061 | 0.728 | 0.037 |
| GPU | $n = 193280, d = 14$ | 0.007 | 0.016 | 0.648 | 0.023 | 0.016 | 0.659 | 0.012 | 0.014 | 0.473 | 0.009 |
| Music Song | $n = 412276, d = 90$ | 0.011 | 0.734 | 1.065 | 0.148 | 0.728 | 1.053 | 0.030 | 0.487 | 0.255 | 0.016 |

Add a noise by applying a random Gaussian matrix to a dataset to obtain a processed dataset, wherein the dataset is owned by a party among a plurality of parties, and there are a plurality of datasets owned by the plurality of parties, and wherein the processed dataset ensures data privacy protection
702

Remove, from the processed dataset, at least one bias
704

Release the processed dataset to other parties
706

FIG. 7

DATA PROCESSING FOR RELEASE WHILE PROTECTING INDIVIDUAL PRIVACY

BACKGROUND

A single company may possess the personal information of a large quantity of individuals or customers. The company may need to keep such data private in order to protect customers' identities and to protect the company's reputation. However, maintaining the privacy of such data often leads to difficulties in disseminating the data. Improvements in techniques of data privacy and protection are desirable.

BRIEF DESCRIPTION OF THE DRAWINGS

The following detailed description may be better understood when read in conjunction with the appended drawings. For the purposes of illustration, there are shown in the drawings example embodiments of various aspects of the disclosure; however, the invention is not limited to the specific methods and instrumentalities disclosed.

FIG. 6 shows an example table illustrating an evaluation of the techniques described in the present disclosure.

FIG. 7 shows an example process for differentially private data release.

DETAILED DESCRIPTION OF ILLUSTRATIVE EMBODIMENTS

Figure 1:
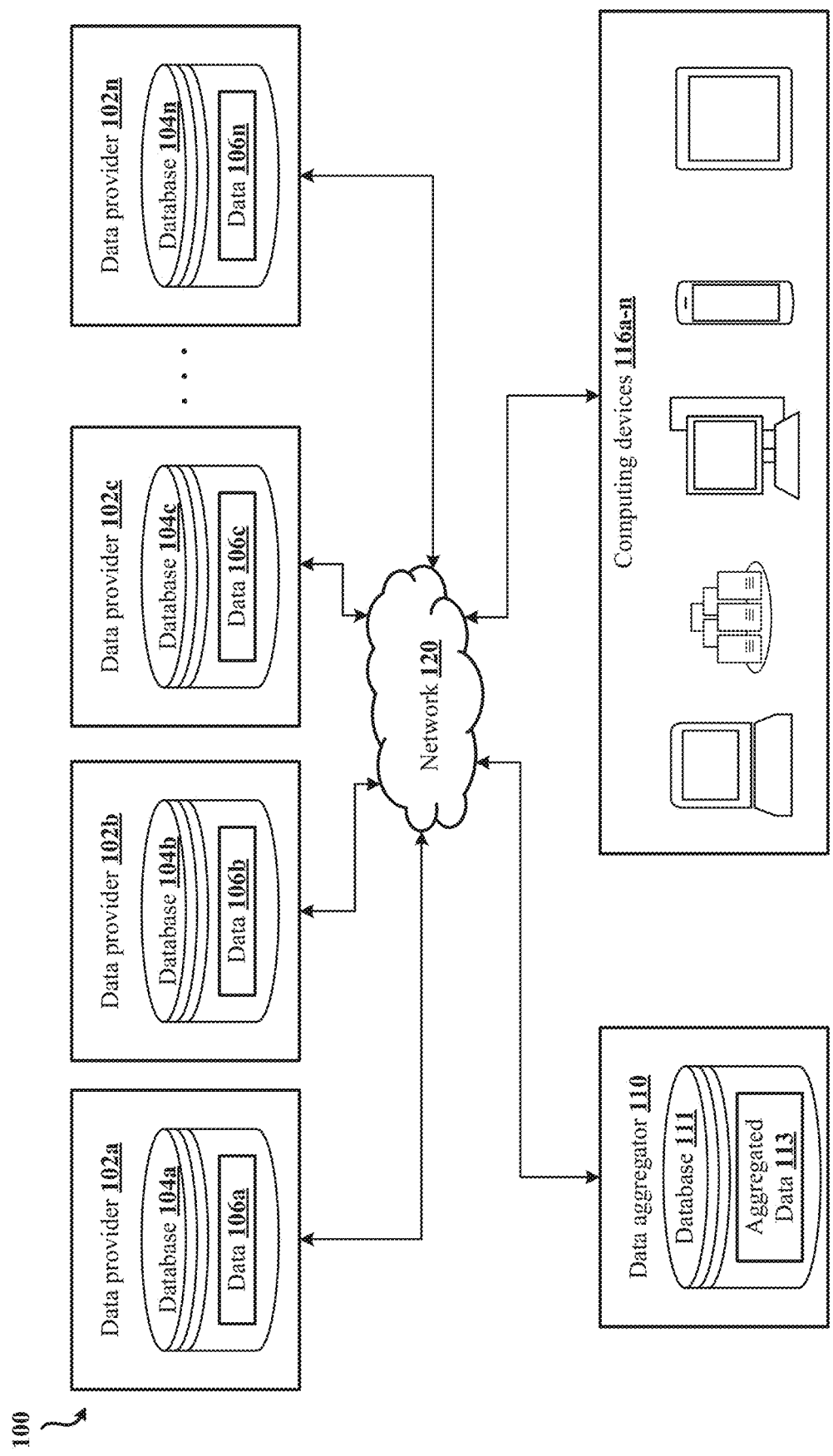
FIG. 1 shows an example prior art system for data release.

Open and public datasets are beneficial to many people and communities. For example, the machine learning community has greatly benefitted from open and public datasets. Unfortunately, privacy concerns surrounding the dissemination of data significantly limit the feasibility of sharing many rich and useful datasets to the public. This is especially true in privacy-sensitive domains like health care, finance, government, etc. Such restriction on the dissemination of data considerably slows down research in those areas. In particular, such restriction on the dissemination of data slows down research in the machine learning realm, as many of today's machine learning algorithms require a large amount of data to be sufficiently trained. Additionally, legal and moral concerns surrounding the protection of individual privacy are becoming increasingly important. For example, many countries have imposed strict regulations on the usage and release of sensitive data (e.g., CCPA, HIPPA, and GDPR).

As such, a tension exists between privacy protection and research promotion. Differentially Private (DP) data release can be used to mitigate such tension. DP is a standard privacy guarantee for algorithms. To hide a single data point from the whole dataset, it requires the impact of any single data point is limited for the overall output. By limiting the impact of any single data point, a change in one data point does not lead to significant change in the Text distribution of randomized output. Formally, DP can be stated as the following: $(\varepsilon, \delta)$-differential privacy. A randomized mechanism $M: \mathcal{D} \rightarrow R$ with domain $\mathcal{D}$ and range $\mathcal{D}$ satisfies $(\varepsilon, \delta)$-differential privacy if for any two adjacent datasets $\mathcal{D}$, $\mathcal{D}' \in \mathcal{D}$, which differ at exactly one data point, and for any subset of outputs $S \subseteq R$, it holds that $P[M(\mathcal{D}) \in S] \leq e^{\varepsilon} \cdot P[M(\mathcal{D}') \in S] + \delta$.

DP data release is a technique to disseminate data without compromising the privacy of data subjects. DP data release provides a formal definition of privacy to regulate the trade-off between two conflicting goals: protecting sensitive information and maintaining data utility. In a DP data release mechanism, the shared dataset is a function of the aggregate of all private data samples. The DP data release guarantees regulate how difficult it is for anyone to infer the attributes or identity of any individual data sample. With a high probability, the public data would be barely affected if any single sample were replaced.

However, many existing DP data release techniques are focused on data release in scenarios where a single party owns all the data and would release that data to the public. In many real-world scenarios, though, there exist multiple parties who each own one or more datasets that are relevant to each other. These multiple parties may want to share their data amongst each other and/or with the public as a whole. In other words, the multi-party setting assumes that multiple parties exist that own disjoint sets of attributes (features or labels) belonging to the same group of data subjects (e.g., patients). For example, in the health care domain, a patient may visit multiple clinics for specialized treatments. Each clinic may only have access to its own attributes (e.g., blood test and CT images) collected from the patient. For the same patient, attributes combined from all clinics that the patient has visited can be more useful to train machine learning models.

One existing approach to release data in a multi-party setting can be performed using the system 100 of FIG. 1. The system 100 includes multiple parties (e.g., a plurality of data providers 102a-n). Each of the data providers 102a-n may maintain a database 104a-n that is configured to store data 106a-n. For example, each of the data providers 102a-n may be a particular health clinic or healthcare provider. Each of the health clinics or healthcare providers may maintain a database that is configured to store patient data. More than one of the databases maintained by the health clinics or healthcare providers may store data associated with the same patient. It may be useful to train a machine learning model using the attributes combined from all clinics that the same patient has visited. In other embodiments, one or more (or all) of the data providers 102a-n may be unrelated to the healthcare profession. Instead, one or more of the data providers 102a-n may be any individual, entity, or business that wants to share their data with the other data providers 102a-n and/or with the public as a whole (e.g., computing devices 116a-n).

The system 100 includes a data aggregator 110. To release the data 106a-n to the other data providers 102a-n and/or with the public as a whole, the data 106a-n may be sent to a centralized place. For example, the data 106a-n may be sent to the data aggregator 110. While depicted in FIG. 1 as being separate from the data providers 102a-n, it should be appreciated that in other embodiments, the data aggregator 110 may be associated with or maintained by one of the data providers 102a-n. In other embodiments, the data aggregator is unassociated with any of the data providers 102a-n. The data aggregator 110 can combine the data from the data providers 102a-n and then release the combined data using a single-party data release approach.

The data providers 102a-n and the computing devices 116a-n may communicate with each other via one or more networks 120. The data aggregator 110 may communicate with the data providers 102a-n and/or the computing devices 116a-n via the one or more networks 120. The network 120 comprise a variety of network devices, such as routers, switches, multiplexers, hubs, modems, bridges, repeaters, firewalls, proxy devices, and/or the like. The network 120 may comprise physical links, such as coaxial cable links, twisted pair cable links, fiber optic links, a combination thereof, and/or the like. The network 120 may comprise wireless links, such as cellular links, satellite links, Wi-Fi links and/or the like.

The computing devices 116a-n may comprise any type of computing device, such as a server, a mobile device, a tablet device, laptop, a desktop computer, a smart television or other smart device (e.g., smart watch, smart speaker, smart glasses, smart helmet), a gaming device, a set top box, digital streaming device, robot, and/or the like. The computing devices 116a-n may be associated with one or more users. A single user may use one or more of the computing devices 116a-n to access the network 120.

In some instances, one or more of the data providers 102a-n may be prohibited from sending data to another party. This may be especially true for a privacy-sensitive organization like a health clinic or healthcare provider. In such instances, the data 106a-n may not be able to be sent to the data aggregator 110. An alternative existing approach is to let each data provider 102a-n individually release its own data 106a-n to the public (e.g., computing devices 116a-n) after adding data-wise Gaussian noise to the data. The public, including machine learning practitioners, can combine the data together to train machine learning models. However, the resulting machine learning models trained on the data combined in this way show a significantly lower utility compared to the machine learning models trained on non-private data.

The systems and methods described herein bridge this utility gap related to DP data release in the multi-party setting. Different stakeholders may own disjoint sets of attributes belonging to the same group of data subjects. Two DP algorithms within the context of linear regression are described herein. The two DP algorithms described herein allow the parties in the multi-party setting to share attributes of the same data subjects publicly through a DP mechanism. The two DP algorithms described herein protect the privacy of all data subjects and can be accessed by the public, including any party in the multi-party setting. For example, the parties in the multi-party setting or the public may use the data shared through the DP mechanisms described herein to train machine learning models on the complete dataset (e.g., data from all parties in the multi-party setting) without the ability to infer private attributes or the identities of individuals.

Figure 2:
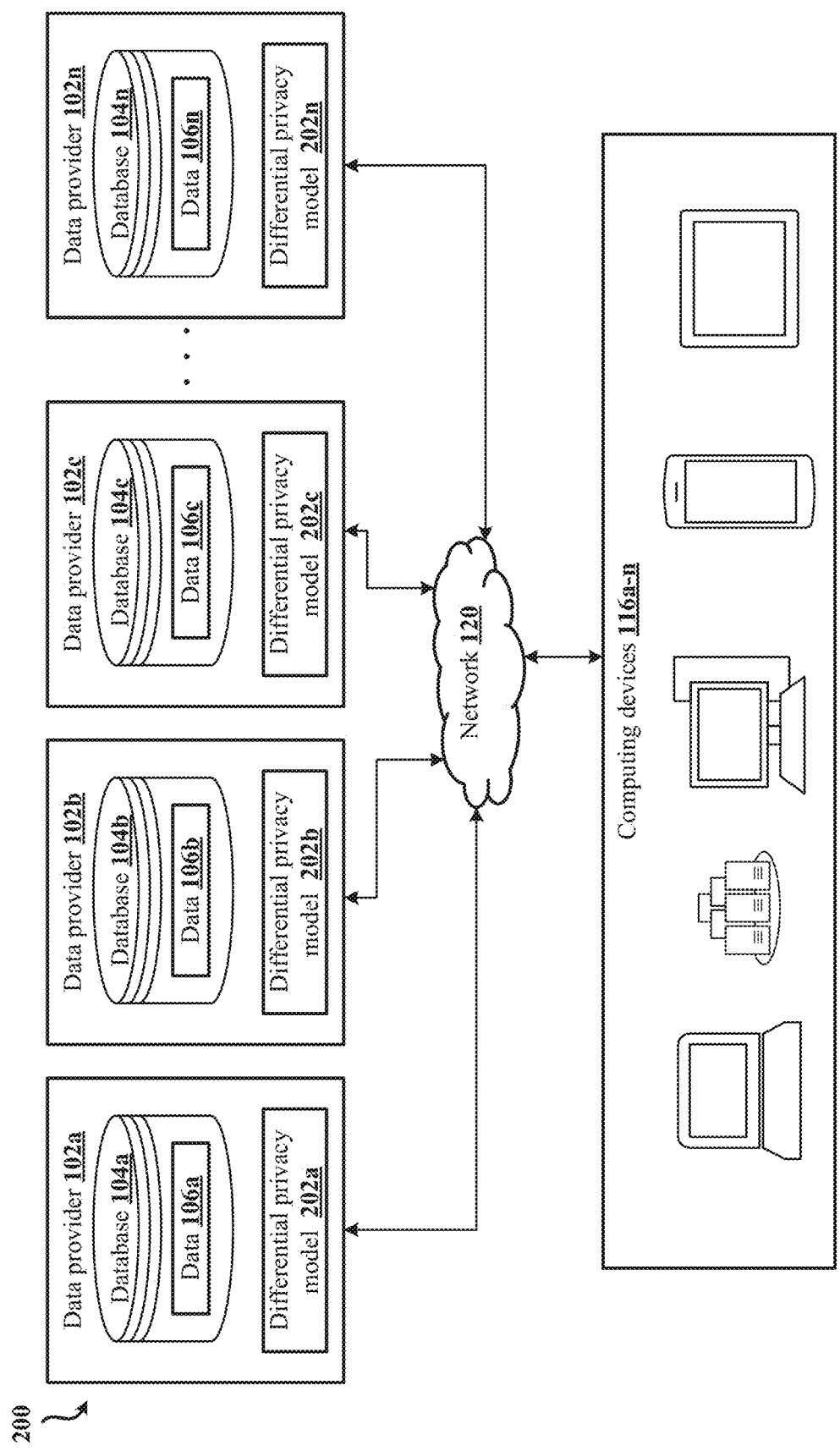
FIG. 2 shows an example system for differentially private data release.

The DP algorithms as described in the present disclosure may be utilized for a variety of different reasons in a variety of different systems. FIG. 2 illustrates an example system 200 capable of employing the two, improved DP algorithms described herein. The system 200 includes multiple parties (e.g., the plurality of data providers 102a-n). As described above, each of the data providers 102a-n may maintain a database 104a-n that is configured to store data 106a-n. For example, each of the data providers 102a-n may be a particular health clinic or healthcare provider. Each of the health clinics or healthcare providers may maintain a database that is configured to store patient data. More than one of the databases maintained by the health clinics or healthcare providers may store data associated with the same patient. It may be useful to train a machine learning model using the attributes combined from all clinics that the same patient has visited. One or more of the data providers 102a-n may be any individual, entity, or business that wants to share their data with the other data providers 102a-n and/or with the public as a whole (e.g., computing devices 116a-n).

Figure 3:
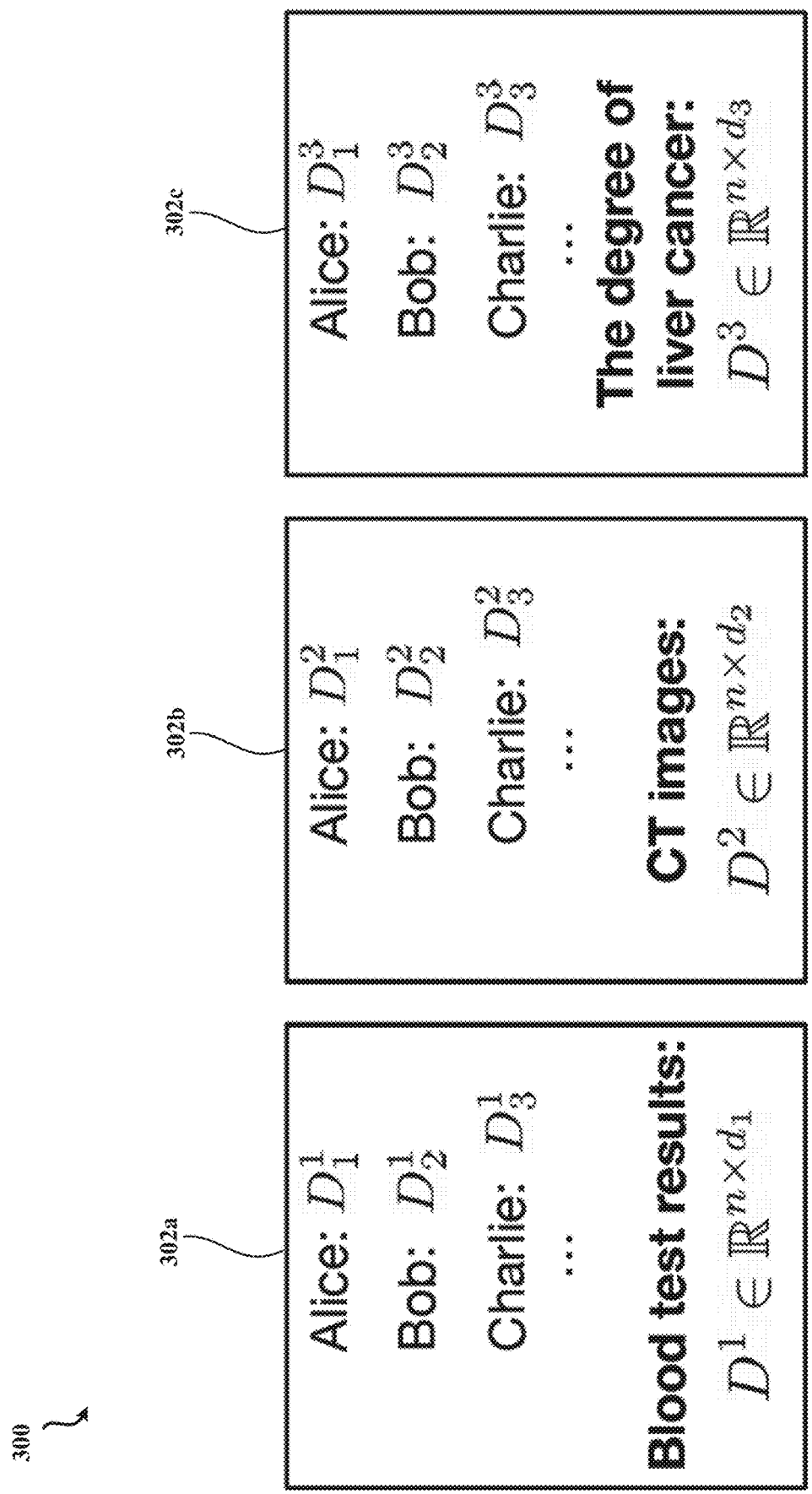
FIG. 3 shows example data associated with a plurality of parties.

FIG. 3 shows an example data 300 associated with three of the data providers 102a-n. The first data set 302a is associated with a first data provider 102a, the second data set 302b is associated with a first data provider 102b, and the third data set 302c is associated with a third data provider 102c. The data sets 302a-c are all associated with the same three patients (Alice, Bob, and Charlie). The three patients have visited all three of the data providers 102a-c (e.g., health clinics or healthcare providers). For example, the three patients may all have visited the first data provider 102a, where the three patients had blood work done. The first data provider 102a may maintain data associated with the results of those blood tests for all three of the patients. Similarly, the three patients may all have visited the second data provider 102b, where the three patients had CT scans. The second data provider 102b may maintain data associated with the CT scans for all three of the patients. Lastly, the three patients may all have visited the third data provider 102c, where the three patients had their liver cancer assessed. The third data provider 102c may maintain data associated with the results of those liver cancer assessments for all three of the patients. It may be useful to train a machine learning model using the attributes combined from all clinics that these patients have visited, as each of these clinics have different information related to the patients. When the data from all of the clinics is viewed as a whole, it provides a more comprehensive understanding of the three patients' health.

Referring back now to FIG. 2, each of the data providers 102a-n include a differential privacy model 202a-n. Each differential privacy model 202a-n is configured to perform one or more of the two, improved DP algorithms described herein. Both of the two, improved DP algorithms are based on a Gaussian DP Mechanism within the context of linear regression. Gaussian mechanism is a post-hoc mechanism to convert a deterministic real valued function $f: \mathcal{D} \to \mathbb{R}^m$ to a randomized algorithm with differential privacy guarantee. It relies on sensitivity of $f$, which is defined as the maximum difference of output $\|f(D)-f(D')\|$ where D and D' are two adjacent datasets. The Gaussian mechanism for differential privacy can be stated as the following lemma.

The first lemma states that, for any deterministic real-valued function $f: \mathcal{D} \to \mathbb{R}^m$ with sensitivity $S_f$, a randomized function can be defined by adding Gaussian noise to $f$: $f^{dp}(D):=f(D)+R$, where R is sampled from a multivariate normal distribution $\mathcal{N}(0, S_f^2 \sigma^2 \cdot I)$. When $$\sigma \geq \frac{\sqrt{2\log\left(\frac{1}{1.25\delta}\right)}}{\varepsilon},$$

$f^{dp}$ is $(\varepsilon,\delta)$-differential privacy. To simplify notations, $\sigma_{\varepsilon,\delta}$ can be defined as $$\frac{\sqrt{2\log\left(\frac{1}{1.25\delta}\right)}}{\varepsilon}.$$

The second lemma (e.g., Johnson-Lindenstrauss (JL) Lemma) is a technique to compress a set of vectors $S=\{v_1, \ldots, v_l\}$ with dimension d to a lower dimension space k<d. With a proper selection k, S can be compressed so that the distance between any two vectors can be maintained with a high probability. The Bernoulli version of the JL Lemma states, if S is an arbitrary set of l points in $\mathbb{R}^d$, and A is a k×d random matrix, where $A_{ij}$ are independent random variables from the following distribution:

$$A_{ij} = \begin{cases} +1 & \text{with probability } 1/2 \\ -1 & \text{with probability } 1/2 \end{cases}, \text{ and } M := \frac{1}{\sqrt{k}}A,$$

with probability at least $$(1-l_2)\exp\left(-k\left(\frac{\beta^2}{4}-\frac{\beta^3}{6}\right)\right),$$

for any $u, v \in S$, $(1-\beta)\|u-v\| \leq \|Mu-Mv\| \leq (1+\beta)\|u-v\|$.

From this distance preserving lemma, the following inner-product preserving corollary can be conducted. The corollary (e.g., JL Lemma (Bernoulli) corollary) for inner-product preserving corollary) follows the same definitions for the point set S and a random matrix M in the second lemma described above, and s may further be denoted as any upper bound for the maximum norm for vectors in S. i.e. $s \geq \max_{u \in S}\|u\|$. With probability of at least $$1-(l+1)^2\exp\left(-k\left(\frac{\beta^2}{4}-\frac{\beta^3}{6}\right)\right)\frac{u^Tv}{s^2}-4\beta \leq \frac{(Mu)^T}{s^2} \leq \frac{u^Tv}{s^2}+4\beta.$$

The first improved DP algorithm is a De-biased Gaussian Mechanism for Ordinary Least Squares (DGM-OLS). To perform the first DP algorithm, the differential privacy models 202a-n may add Gaussian noise directly to data 106a-n belonging to the respective data provider 102a-n. For example, the differential privacy model 202a may add Gaussian noise directly to data 106a belonging to the data provider 102a, etc. After adding Gaussian noise to the data 106a-n, the differential privacy models 202a-n may continue to perform the first DP algorithm by removing certain biases from the resulting Hessian matrix.

The second improved DP algorithm is a Random Mixing prior to Gaussian Mechanism for Ordinary Least Squares (RMGM-OLS). To perform the second DP algorithm, all of the differential privacy models 202a-n may utilize a shared Bernoulli projection matrix. All of the differential privacy models 202a-n may utilize the shared Bernoulli projection matrix to compress the data 106a-n belonging to the respective data provider 102a-n along a sample-wise dimension. After compressing the data 106a-n, the differential privacy models 202a-n may continue to perform the second DP algorithm adding Gaussian noise to the compressed data.

The following notations will be used to describe the first and second improved DP algorithms in more detail below. $D^j$, where $j=1, \ldots, m$, as data matrices for m parties, where $D^j \in \mathbb{R}^{n \times d_j}$ and $m \geq 2$. They are aligned by the same set of subjects but have different attributes. D is defined as $[D^1, \ldots, D^m] \in \mathbb{R}^{n \times (d+1)}$ as the collection of all datasets, where $d=d_1+\ldots+d_m-1$ (d may be reduced by −1 because it may be assumed that one of the columns in the label, which will be treated separately). $D_i$ may be denoted as the ith data (row) of D. It may be assumed that $D_i$, $i=1, \ldots, n$, are i.i.d sampled from an underlying distribution P over $\mathbb{R}^{d+1}$.

The first and second improved DP algorithms described in more detail below are subject to a privacy constraint. The privacy constraint denotes $A_1$ as the release algorithm. $A_1$ takes $D^j$, $j=1, \ldots, m$, from all parties as input and outputs the private dataset $D^{pub} \in \mathbb{R}^{n' \times (d+1)}$ ($n'=n$ is not restricted). It is not enough to only ask $D^{pub}$ to be private, because each data provider 102a-n does not want to leak the privacy to the other data providers 102a-n either. If I is the set information shared between parties in the algorithm $A_1$, it may be required that for any $j \in \{1, \ldots, m\}$, $(D^{pub}, I)$ is $(\varepsilon,\delta)$-differentially private with respect to dataset $D^j$.

The first and second improved DP algorithms described in more detail below are associated with a utility target. One of the attributes that the linear regression task is associated with is the label and all remaining attributes are features. The label is assumed to be the last dimension. The population loss for any linear model $w \in \mathbb{R}^d$ is defined by $L(w; P)=E_{(x,y) \sim P}[(w^Tx-y)^2]$. The minimizer for the population loss may be defined as $w^*$. $A_2$ and $\hat{w}_n$ may be denoted as the learning algorithm from private data $D^{pub}$ and the learned linear model. The learning algorithm $A_2$ may depend on $A_1$. $\hat{w}_n$ may converge to $w^*$ in probability as the size of dataset n increases. Formally, it is defined as $$\forall \beta > 0, \lim_{n \to \infty} \mathbb{P}[\|\hat{w}_n - w^*\| > \beta] = 0.$$

A sequence $\{X_n\}$ of random variables in $\mathbb{R}^d$ converges in probability towards the random variable X if for all $$\beta > 0, \lim_{n \to \infty} \mathbb{P}[\|X_n - X\| > \beta] = 0.$$

This convergence may be denoted as $$\plim_{n \to \infty} X_n = X.$$

Two more assumptions may also be made for both the first and second improved DP algorithms. First, it may be assumed that the absolute values of all attributes are bounded by 1. For example, it may be assumed that all data samples have been scaled or normalized and that $E_{(x,y) \sim P}[xx^T]$ exists. Second, the no perfect multicollinearity assumption may apply. The no perfect multicollinearity assumption states that there is no exact linear relationship among independent variables. For example, it may be assumed that $E_{(x,y) \sim P}[xx^T]$ is positive definite. For this assumption, $w^*$ has an explicit form: $(E_{(x,y) \sim P}[xx^T])^{-1} E_{(x,y) \sim P}[x \cdot y]$.

As discussed above, the first improved DP algorithm is a De-biased Gaussian Mechanism for Ordinary Least Squares (DGM-OLS). The first improved DP algorithm includes two stages: dataset release and learning. The first improved DP algorithm may be represented by $A^{dgm}$, the dataset release stage may be represented by $A_1^{dgm}$, and the learning stage may be represented by $A_2^{dgm}$ so that $A^{dgm}=(A_1^{dgm}, A_2^{dgm})$.

In embodiments, for $A_1^{dgm}$, to meet the privacy requirement for $A_1$, a Gaussian mechanism may be directly applied to each data matrix $D^j$ (j=1, . . . , m). Two neighboring data matrices $D^j$ and $(D^j)'$ may differ at exactly one row and this row index may be denoted as i. As discussed above, it is assumed that the absolute values of all attributes are bounded by 1. Accordingly, $\|D^j$ and $(D^j)'\|=\|D_i^j$ and $(D_i^j)'\|\leq 2\sqrt{d_j} \leq 2\sqrt{d}$, where $d_j \leq d$ is due to m≥2. Each data provider 102a-n may independently add a Gaussian noise, such as a Gaussian noise $R^j$ to $D^j$. Elements in $D^1$ may be independent and identically distributed (e.g., i.i.d) sampled from a Gaussian distribution with a mean zero and a variance $4d\sigma_{\epsilon,\delta}^2$. $A_1^{dgm}(D^1, \ldots, D^m)$ may be equal to $[D^1+R^1, \ldots, D^m+R^m]$. Because there is no shared information I between different data providers 102a-n in the first improved DP algorithm and $A_1^{dgm}(D^1, \ldots, D^m)$ is $(\epsilon,\delta)$-differentially private with respect any dataset $D^j$, it meets the privacy constraint described above. $D^{dgm}$ may be denoted by $A_1^{dgm}(D^1, \ldots, D^m)$.

In embodiments, for $A_2^{dgm}$, the feature matrix and the label vector of the private joint dataset may be written as [X,Y]=D. The feature matrix and the label vector from the released dataset may be similarly denoted as $[X^{dgm}, Y^{dgm}]=D^{dgm}$. R may be defined as being equal to $[R^1, \ldots, R^m] \in \mathbb{R}^{n \times (d+1)}$ and R may be split into split $R_X$ and $R_Y$, representing the additive noise to X and Y respectively. It may be observed that $$\plim_{n \to \infty} \frac{1}{n}(X^{dgm})^T X^{dgm} =$$

$$\plim_{n \to \infty} \frac{1}{n}(X^T X + X^T R_x + R_x^T X + R_x^T X) = E_{(x,y)} \sim P[xx^T] + 4d\sigma_{\epsilon,\delta}^2 \cdot I,$$

where the last equation holds by the concentration of bounded random variables and multivariate normal distribution.

Similarly, $$\plim_{n \to \infty} \frac{1}{n}(X^{dgm})^T Y^{dgm} = E_{(x,y)} \sim P[x \cdot y].$$

The learning algorithm $A_2^{dgm}$ may be defined as $$A_2^{dgm}(D^{dgm}) = \frac{1}{n}(\hat{H}_n^{dgm})^{-1}(X^{dgm})^T Y^{dgm},$$

wherein $$\hat{H}_n^{dgm} := \frac{1}{n}(X^{dgm})^T X^{dgm} - 4d\sigma_{\epsilon,\delta}^2 \cdot I.$$

The utility is guaranteed by the following theorem: when $\beta \leq c$ for some variable c that is dependent on $\sigma_{\epsilon,\delta}^2$, d, and P, but is independent of n, $$\mathbb{P}[\|\hat{w}_n^{dgm} - w^*\| \leq \beta] \geq 1 - \exp\left(-\tilde{O}\left(\beta^2 \frac{n}{\sigma_{\epsilon,\delta}^4 d^4}\right)\right). \hat{H}_n^{dgm}$$

is a random matrix. Although the expectation (on average) of $\hat{H}_n^{dgm}$ is positive definite, each instance may not be positive definite. The existence of the inverse of $\hat{H}_n^{dgm}$ is not guaranteed. It may be possible that it has a small eigenvalue. As a result, its inverse may get exploded. The second improved DP algorithm, discussed below in more detail, overcomes this limitation.

In summary, the first improved DP algorithm can be stated as follows: For the release algorithm $A_1^{dgm}(D=[D^1, \ldots, D^m], \epsilon, \delta)$: (1), for j=1, . . . , m, do (2) $(D^{dgm})^j := D^j + R^j$, where $R^j \in \mathbb{R}^{n \times d_j}$ and is a random Gaussian matric and elements in $R^j$ are i.i.d. sampled from $N(0, 4d \cdot \sigma_{\epsilon,\delta}^4)$. (3) end for (4) $D^{dgm} := [(D^{dgm})^1, \ldots, (D^{dgm})^m]$ (5) return $D^{dgm}$. For the learning algorithm $$A_2^{dgm}(D^{dgm}, \epsilon, \delta):$$

$$[X^{dgm}, Y^{dgm}] = D^{dgm} \quad (1)$$

$$\hat{H}_n^{dgm} := \frac{1}{n}(X^{dgm})^T X^{dgm} - 4d\sigma_{\epsilon,\delta}^2 \cdot I \quad (2)$$

$$\hat{w}_n^{dgm} := (\hat{H}_n^{dgm})^{-1} \frac{1}{n}(X^{dgm})^T Y^{dgm}. \quad (3)$$

$$\text{return } \hat{w}_n^{dgm}. \quad (4)$$

As discussed above, the second improved DP algorithm is a Random Mixing prior to Gaussian Mechanism for Ordinary Least Squares (RMGM-OLS) algorithm. For the release algorithm $A_1^{dgm}$ of the first improved DP algorithm, the norm of additive noise $R_x$ has the same order as the norm feature matrix X in n. Both of them are in linear order of n. The noise may not diminish as n→∞ and as a result, $4d\sigma_{\epsilon,\delta}^2 \cdot I$ has to be subtracted from $(X^{dgm})^T X^{dgm}$ to overcome this additive noise in $A_1^{dgm}$. To make the summation of n data points differentially private, a constant additive noise may be enough. This constant additive noise is relatively small compared with the summation of n data points.

The second improved DP algorithm takes this insight into account. The second improved DP algorithm includes two stages: dataset release and learning. The first improved DP algorithm may be represented by $A^{rmgm}$, the dataset release stage may be represented by $A_1^{rmgm}$, and the learning stage may be represented by $A_2^{rmgm}$ so that $A^{dgm}=(A_1^{rmgm}, A_2^{rmgm})$.

In embodiments, for $A_1^{rmgm}$, a may be denoted as any n dimensional vector in $\{-1,1\}^n$. Suppose $D^j$ and $(D^j)'$ are two neighboring datasets and they are different at row index i. The sensitivity of $a^T D^j$ is $\|a^T D^j - a^T (D^j)'\| = \|D_i^j - (D_i^j)'\| \leq 2\sqrt{d_j} \leq 2\sqrt{d}$. Generally, if $$A \in \{-1, 1\}^{k \times n}, \frac{1}{\sqrt{k}} \cdot AD^j$$

has sensitivity $2\sqrt{d}$ as well. $A_1^{rmgm}$ can then be defined as $$A_1^{rmgm}(D^1, \ldots, D^m) = \left[\frac{1}{\sqrt{k}} \cdot AD^1 + R^1, \ldots, \frac{1}{\sqrt{k}} \cdot AD^m + R^m\right],$$

where $A \in \{-1, 1\}^{k \times n}$ is a random matrix that each element is i.i.d. sampled from the distribution $A_{ij}$ defined above and each $R^j \in \mathbb{R}^{k \times d}_j$ is a random matrix that each element is i.i.d. sampled from a Gaussian distribution with a mean zero and a variance $4d\sigma_{\epsilon,\delta}^2$.

To see how the insight gleaned from the first improved DP algorithm can be applied to the second improved DP algorithm, rows of $AD^j$ are k pseudo data points, where each data point is a ±1 mixing of n points in $D_j$. The additive noise $R^j$ is relatively small compared to $$\frac{1}{\sqrt{k}} AD^j.$$

Indeed, $\|R^j\|$'s order is $\tilde{O}(k)$. With JL Lemma, $$\left\| \frac{1}{\sqrt{k}} AD^j \right\| \approx \|D^j\|$$

is in order $\tilde{O}(n)$. If $k=o(n)$, the additive noise will diminish as zero→∞.

Regarding the privacy guarantee, $D^{rmgm}$ may be denoted as $A_1^{rmgm}(D^1, \ldots, D^m)$. In the above definition, A is shared among all parties. It then requires that $(D^{rmgm}, A)$ is $(\epsilon, \delta)$-differentially private. Because it is assumed that the absolute values of all attributes are bounded by 1, $D^{rmgm}$, A) is $(\epsilon, \delta)$-differentially private.

In embodiments, for $A_2^{rmgm}$, the feature matrix and the label vector from the released dataset may be denoted as $[X^{rmgm}, Y^{rmgm}] = D^{rmgm}$. R may be defined as being equal to $[R^1, \ldots, R^m] \in \mathbb{R}^{k \times d}$ and R may be split into split $R_X \in \mathbb{R}^{k \times d}$ and $R_Y \in \mathbb{R}^k$, representing the additive noise to $$\frac{1}{\sqrt{k}} AX \text{ and } \frac{1}{\sqrt{k}} AY$$

respectively. First, regarding $$\frac{1}{n}(X^{rmgm})^T X^{rmgm}:$$

with the fact that $$\frac{1}{n}(X)^T X$$

would converge to $$E_{(x,y)}P[xx^T], \frac{1}{n}(X^{rmgm})^T X^{rmgm} - \frac{1}{n}(X)^T X$$

converges to zero by the following decomposition:

$$\frac{1}{n}\left(X^T \frac{A^T A}{k} X - X^T X\right) + \frac{1}{n}\left(X^T \frac{A^T}{\sqrt{k}} R_x + R_x^T \frac{A}{\sqrt{k}} X\right) + \frac{1}{n} R_x^T R_x.$$

Each term in this decomposition converges to zero, as detailed below.

The first term, $$\frac{1}{n}\left(X^T \frac{A^T A}{k} X - X^T X\right),$$

converges to zero. Because it is assumed that the absolute values of all attributes are bounded by 1, it follows that each column in X is no larger than $\sqrt{n}$. To apply the JL Lemma (Bernoulli) corollary described above, the point set S can be set as the set of column vectors and the previous argument shows that $s=\sqrt{n}$ is one upper bound for maximum norm of vectors in S. The JL Lemma (Bernoulli) corollary helps guarantee the approximation.

The second term, $$\frac{1}{n}\left(X^T \frac{A^T}{\sqrt{k}} R_x + R_x^T \frac{A}{\sqrt{k}} X\right),$$

converges to zero. $X_{:,j}$ may be denoted as the jth column of X. With high probability (with respect to a large n), each element in $$\frac{1}{n} X_{:,j}$$

is bounded by some small $$\alpha = o\left(\frac{1}{\sqrt{n}}\right)$$

from Hoeffding inequality. Conditioned on any fixed $$\frac{1}{n} X_{:,j} \leq \alpha \cdot 1, \frac{1}{\sqrt{k}}\left((R_x)_{:,i}\right)^T \frac{1}{n} AX_{:,j}$$

is equivalent to a Gaussian variable with mean zero and variance less than α. Then the concentration of Gaussian distribution implies that with high probability, $$\frac{1}{\sqrt{k}}\left((R_x)_{:,i}\right)^T \frac{1}{n} AX_{:,j}$$

is small. The union bound leads to the convergence of this d×d matrix $$\left\| \frac{1}{n}\left(X^T \frac{A^T}{\sqrt{k}} R_x + R_x^T \frac{A}{\sqrt{k}} X\right) \right\|.$$

The third term, $$\frac{1}{n} R_x^T R_x,$$

converges to zero.

$$\left\|\frac{1}{k}R_x^T R_x\right\|$$

will converge to $4d\sigma_{\epsilon,\delta}^2 \cdot I$ if k increases as $n\to\infty$. If $$k = o(n), \frac{k}{n} \cdot 4d\sigma_{\epsilon,\delta}^2 \cdot I$$

will converge to zero as $$\plim_n \frac{1}{n}(X^{rmgm})^T Y^{rmgm} - \frac{1}{n}X^T Y = 0$$

is analyzed similarly. The learning stage algorithm $A_2^{rmgm}$ ($D^{rmgm}$) may then be defined as $$\frac{1}{n}(\hat{H}_n^{rmgm})^{-1}(X^{rmgm})^T Y^{rmgm}, \text{ where } \hat{H}_n^{rmgm} := \frac{1}{n}(X^{rmgm})^T X^{rmgm}.$$

This convergence relies on the proper selection of k. There exists a trade-off. Namely a larger k makes better rate for the approximation to recover the inner product but makes a worse rate for the diminishment of additive noise. The utility is guaranteed by the following theorem: when $\beta \leq c$ for some variable c that is dependent on $\alpha_{\epsilon,\delta}$, and P, but is independent of n, $$\mathbb{P}[\|\hat{w}_n^{rmgm} - w^*\| \leq \beta] \geq 1 - \exp\left(-O\left(\min\left\{\frac{k\beta^2}{d^2}, \frac{n\beta}{kd^2\alpha_{\epsilon,\delta}^2}, \frac{n^{\frac{1}{2}}\beta}{d^{\frac{3}{2}}\alpha_{\epsilon,\delta}}\right\}\right) + \tilde{O}(1)\right).$$

If $$k = O\left(\frac{n^{\frac{1}{2}}\beta}{\alpha_{\epsilon,\delta}}\right),$$

$$\mathbb{P}[\|\hat{w}_n^{rmgm} - w^*\| \leq \beta] \geq$$

$$1 - \exp\left(-O\left(\min\left\{\frac{n^{1/2}\beta^2}{d^2\alpha_{\epsilon,\delta}}, \frac{n^{1/2}\beta}{d^2\alpha_{\epsilon,\delta}}, \frac{n^{\frac{1}{2}}\beta}{d^{\frac{3}{2}}\alpha_{\epsilon,\delta}}\right\}\right) + \tilde{O}(1)\right).$$

In the theorem, k is selected to balance $$\frac{k\beta^2}{d^2} \text{ and } \frac{n\beta}{kd^2\alpha_{\epsilon,\delta}^2}.$$

To achieve the optimal rate for $f(\beta)$ with any fixed $\beta$, the optimal k is chosen as $$O\left(\frac{n^{1/2}}{\alpha_{\epsilon,\delta}}\right).$$

In summary, the second improved DP algorithm can be stated as follows: For the release algorithm $A_1^{rmgm}$ (D= $[D^1, \ldots, D^m]$, $\epsilon, \delta$, k): (1) A first data provider 102a-n samples a k×n random matrix A, where all $A_{ij}$ are i.i.d. sampled from the distribution $$Aij = \begin{cases} +1 & \text{with probability } 1/2 \\ -1 & \text{with probability } 1/2 \end{cases}$$

and sends A to all other data providers 102a-n. (2) for j=1, ..., m do $$(D^{rmgm})^j := \frac{1}{\sqrt{k}} \cdot AD^j + R^j \quad (3)$$

is a k×$d_j$ random matrix and elements in $R^j$ are i.i.d. sampled from $\mathcal{N}(0, 4d\sigma_{\epsilon,\delta}^2)$. (4) end for (5) $D^{rmgm}:=$ $[(D^{rmgm})^1, \ldots, (D^{rmgm})^m]$ (6) return $D^{rmgm}$. For the learning algorithm $A_2^{rmgm}(D^{rmgm})$:

$A_2^{rmgm}(D^{rmgm})$:

$[X^{rmgm}, Y^{rmgm}]$     (1)

$\hat{H}_n^{rmgm} := \frac{1}{n}(X^{rmgm})^T X^{rmgm}$     (2)

$\hat{w}_n^{rmgm} := (\hat{H}_n^{rmgm})^{-1}\frac{1}{n}(X^{rmgm})^T Y^{rmgm}$.     (3)

return $\hat{w}_n^{rmgm}$.     (4)

As compared with the first improved DP algorithm, the second improved DP algorithm solves the near-zero eigenvalue issue because $\hat{H}_n^{rmgm} \succ 0$ holds naturally by definition. Although the order is sacrificed from n to $\sqrt{n}$, the second improved DP algorithm still outperforms the first improved DP algorithm on both synthetic datasets (even when n is as large as $10^6$) as well as various real-world datasets. The performances of the first and second improved DP algorithms are discussed in more detail below.

The first and second improved DP algorithms were evaluated on both synthetic and real-world datasets. The performance evaluations with regard to the synthetic datasets were designed to verify the theoretical asymptotic results by increasing the training set size n. The performance of the two improved algorithms were also evaluated on four real world datasets.

To evaluate the second improved DP algorithm, k was set as $$\frac{\sqrt{n}}{\sigma_{\epsilon,\delta}}$$

for synthetic dataset experiments and k was set as $$\frac{3\sqrt{n}}{\sigma_{\epsilon,\delta}}$$

for real-world dataset experiments. For the numerical computation stability of the inverse operation, a small $\lambda \cdot I$ may be added with $\lambda=10^{-5}$ to all Hessian matrices. Additionally, the following baselines were considered to help qualify the performance of the improved DP algorithms: OLS refers to the explicit solution for linear regression given training data (X, Y) and serves as the performance's upper bound for private algorithms. Biased Gaussian mechanism (BGM-OLS) refers to the algorithm that under the same $A_1^{bgm} = A_1^{bgm}$, $D^{bgm} := A_1^{bgm}(D^1, \ldots, D^m)$ is taken as the new feature matrix and the explicit form of the solution may be directly applied on top of $(A^{bgm}, Y^{bgm})$. $A_2^{bgm}$ is defined as $((X^{bgm})^T X^{bgm})^{-1} (X^{bgm})^T Y^{bgm}$. Compared to $A_2^{bgm}$, $4d\sigma_{\epsilon,\delta}^2 \cdot I$ is not subtracted when estimating the Hessian matrix in $A_2^{bgm}$.

In the experiments on synthetic datasets, the probability of the $l^2$ distance between the linear weights from each algorithm or baseline and the ground truth linear weight were estimated. The expectation of the $l^2$ distance between weights for different algorithms was also evaluated. For the experiments on real world datasets, the two improved DP algorithms were evaluated by the population loss, i.e., mean squared loss on the test set.

First, with regard to evaluation on synthetic datasets, to simulate the data, feature dimension d was set as d=10. To generate the ground truth linear model w*, each weight value was independently sampled from uniform distribution $$U'\left[-\frac{1}{d}, \frac{1}{d}\right].$$

Each data (x, y) is sampled as following: each feature value in x is independently sampled from U'[−1, 1] and $y=(w^*)^T x$. Both assumptions described above can be easily verified. For the first assumption that the absolute values of all attributes are bounded by 1, $\|x_i\| \leq 1$ holds by the definition and $$\|y\| \leq \|x\| \cdot \|w^*\| \leq \sqrt{d} \cdot \frac{1}{\sqrt{d}} = 1.$$

For the no perfect multicollinearity assumption $$E[xx^T] = \frac{1}{3} \cdot I,$$

which is invertible.

Figure 4:
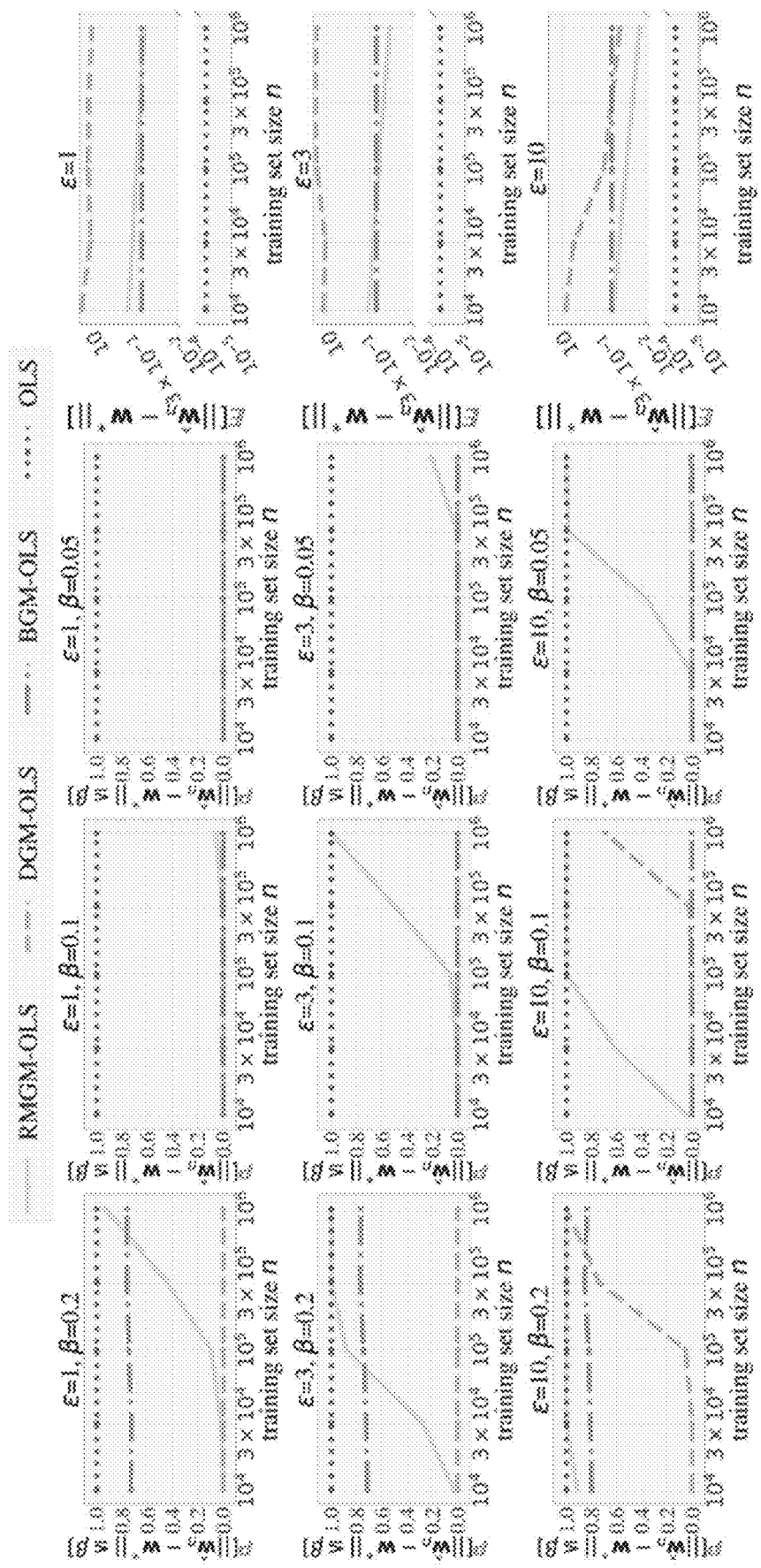
FIG. 4 shows a plurality of exemplary graphs.

Different training set sizes were experimented with. For example, training set sizes of $n=10^4$, $3\times 10^4$, $10^5$, $3\times 10^5$, and $10^6$ and different privacy budgets $\epsilon=1, 3, 10$ with fixed $\delta=10^{-5}$. For each setting (n, $\epsilon$), the experiment was repeated $10^4$ times under different random seeds to estimate the $\mathbb{P}[\|w_n - w^*\| \leq \beta]$ FIG. 4 shows a series of graphs 400 that depict the convergence of $\mathbb{P}[\|w_n - w^*\| \leq \beta]$ as the training data set size n increased for different algorithms. Rows are differential privacy budget $\epsilon$ and columns are convergences at different $\beta$ in $\mathbb{P}[\|w_n - w^*\| \leq \beta]$.

Regarding the two baselines outlined above, OLS solutions, without any private constraint, are close to the ground truth w* under all $\beta$ with probability 1. For all $\beta$, the probability for BGM-OLS stays very low as n increases.

$$\plim_{n \to \infty} \frac{1}{n}(Z^{dgm})^T Z^{dgm} = E_x[xx^T] + 4d\sigma_{\epsilon,\delta}^2 \cdot I,$$

which introduces a non-diminishing bias $4d\sigma_{\epsilon,\delta}^2 \cdot I$. Although it is in the form of $l^2$ regularization, $4d\sigma_{\epsilon,\delta}^2$ is larger than the reasonable regularization term and has a negative impact on the solution. Usually, the regularization is around $10^{-5}$, while $4d\sigma_{\epsilon,\delta}^2 \approx 10$ even if $(\epsilon,\delta)=(10, 10^{-5})$.

The performances of the first and second improved DP algorithms may be compared. The first improved DP algorithm shows asymptotic tendencies for most $(\epsilon,\beta)$, while the second improved DP algorithm shows such tendences in few cases. The second improved DP algorithm outperforms the first improved DP algorithm at both the convergence of probability $\mathbb{P}[\|w_n - w^*\| \leq \beta]$ (the first three columns in the series of graphs 400) and the expected distance $E[\|w_n - w^*\|]$ (the last column in the series of graphs 400). The second improved DP algorithm shows the convergences in all settings except for $(\epsilon,\beta)=(1, 0.2)$ and $(1, 0.05)$. Although the first DP algorithm has better rate at n than the second DP algorithm, $\mathbb{P}[\|w_n - w^*\| \leq \beta]$ is always close to zero when $\epsilon=1, 3$, and even when n is as large as $10^6$.

Figure 5:
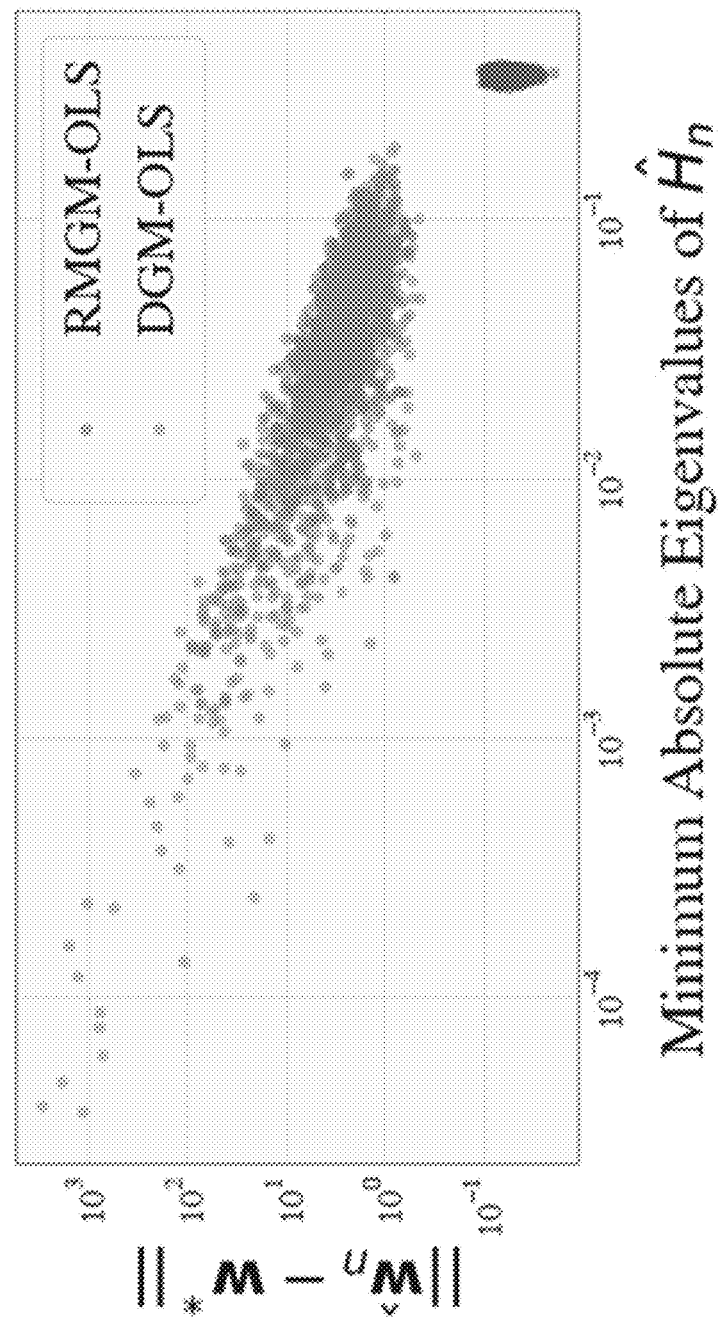
FIG. 5 shows an example scatter plot.

Moreover, in the evaluation of expected weight distance, the first improved DP algorithm sometimes is even worse than BGM-OLS, which is almost random guess. This may be caused by the small eigenvalue issue discussed above. FIG. 5 shows a scatter plot 500 of $l^2$ distance vs. minimum absolute eigenvalue of Hessian matrix when $n=10^6$ and $\epsilon=3$. Each point is processed by a different random seed for the first and second improved DP algorithms. Small eigenvalues may be highly correlated to large $\|\hat{w}_n - w^*\|$. The x-axis in the scatter plot 500 is represents minimum eigenvalues of the Hessian matrix and the y-axis represents the distance between the solution and the optimal solution. Each point is processed by a different random seed for the first improved DP algorithm and BGM-OLS when $n=10^6$ and $\epsilon=3$. $\|\hat{w}_n - w^*\|$ and the minimum absolute eigenvalues of $\hat{H}_n$ have a strong positive correlation. Some samples from the first improved DP algorithm have relatively small eigenvalues ($\leq 10^{-3}$) and have corresponding large distance between $\overline{w}_n$ and w* ($\geq 10$). Overall, the second improved DP algorithm has the best performance across various settings of $\epsilon$ and n on the synthetic data, as its asymptotically optimality is verified and its consistently outperforms the first improved DP algorithm and BGN-OLS.

Second, with regard to evaluation on real world datasets, the first and second improved DP algorithms were evaluated on four real-world datasets: a bike dataset to predict the count of rental bikes from features such as season, holiday, etc., a superconductor dataset to predict critical temperature from chemical features; a GPU dataset to predict running time for multiplying two 2048×2048 matrices using a GPU OpenCL SGEMM kernel with varying parameters, and a music song dataset to predict the release year of a song from audio features. The original dataset was split into training data and test data by the ratio 4:1. The number of training data i and the number of features d used for later evaluated linear regression tasks are listed in a table 600 depicted in FIG. 6. All features and labels are normalized into [0,1]. The table 600 depicts mean squared losses on real world datasets (lower is better). As shown in the table 600, the first improved DP algorithm achieves the lowest losses in most settings For each dataset, OLS and three differentially private algorithms were evaluated by the mean squared loss on the test split. The table 600 shows the results for $\epsilon=1, 3, 10$ and $\delta=10^{-5}$. The loss of the first improved DP algorithm is much larger than others and the second improved DP algorithm achieves the lowest losses for most cases (9 out of 12). This result is consistent with the results on the synthetic dataset.

Accordingly, the second improved DP algorithm is a practical solution to privately release datasets and build linear models for regression tasks.

FIG. 7 illustrates an example process 700 performed by a differential privacy model (e.g., differential privacy model 202a-n). The differential privacy model may perform the process 700 to perform the first improved DP algorithm described above. Although depicted as a sequence of operations in FIG. 7, those of ordinary skill in the art will appreciate that various embodiments may add, remove, reorder, or modify the depicted operations.

As described above, the first improved DP algorithm is a De-biased Gaussian Mechanism for Ordinary Least Squares (DGM-OLS). To perform the first DP algorithm, the differential privacy models 202a-n may add Gaussian noise directly to data 106a-n belonging to the respective data provider 102a-n. For example, the differential privacy model 202a may add Gaussian noise directly to data 106a belonging to the data provider 102a, etc. At 702, noise may be added by applying a random Gaussian matrix to a dataset to obtain a processed dataset. The dataset is owned by a party (e.g., a data provider 102a) among a plurality of parties (e.g., data providers 102a-n). There may be a plurality of datasets owned by the plurality of parties. The processed dataset ensures data privacy protection After adding Gaussian noise to the dataset, the differential privacy models 202a-n may continue to perform the first DP algorithm by removing certain biases from the resulting Hessian matrix. At 704, at least one bias may be removed from the processed dataset. After the bias(es) are removed, the processed dataset is ready to be released to other parties (e.g., other data providers 102a-n). For example, the processed dataset may satisfy $(\epsilon,\delta)$-differential privacy. At 706, the processed dataset may be released to other parties. The other parties may be from the plurality of parties, or may be different parties. Once released to other parties, the other parties may utilize the data without being able to infer the attributes or identity of any individual data sample. For example, the other parties may utilize the data to train one or more machine learning models.

Figure 8:
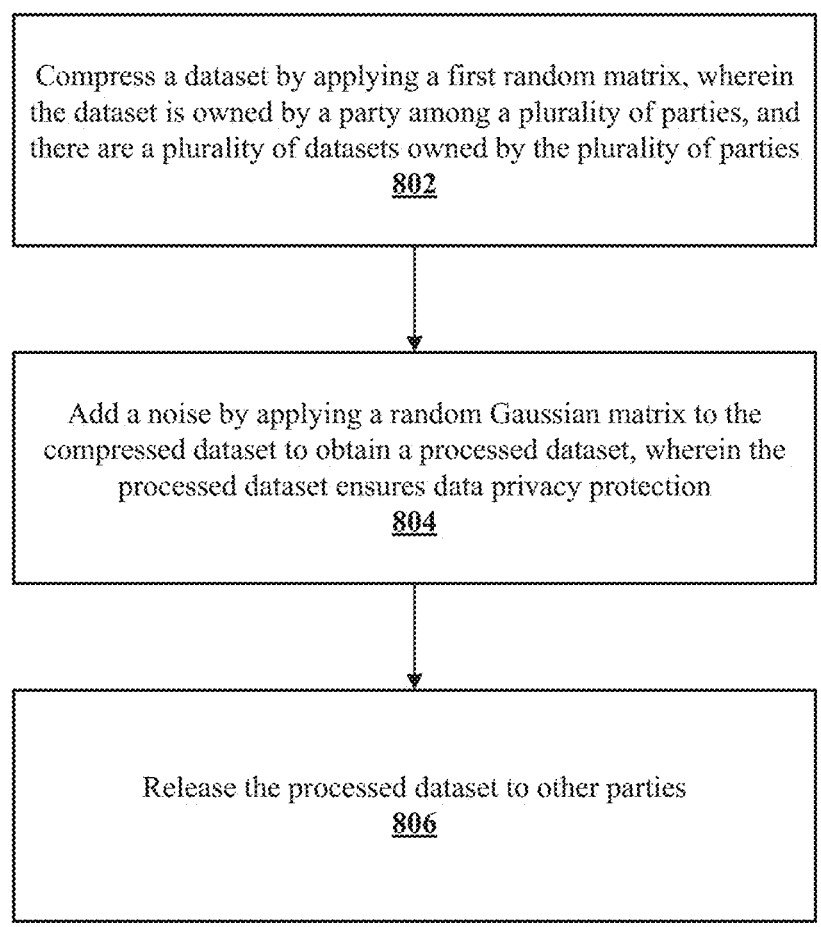
FIG. 8 shows another example process for differentially private data release.

FIG. 8 illustrates an example process 800 performed by a differential privacy model (e.g., differential privacy model 202a-n). The differential privacy model may perform the process 800 to perform the second improved DP algorithm described above. Although depicted as a sequence of operations in FIG. 8, those of ordinary skill in the art will appreciate that various embodiments may add, remove, reorder, or modify the depicted operations.

As described above, the second improved DP algorithm is a Random Mixing prior to Gaussian Mechanism for Ordinary Least Squares (RMGM-OLS). To perform the second DP algorithm, all of the differential privacy models 202a-n may utilize a shared Bernoulli projection matrix. All of the differential privacy models 202a-n may utilize the shared Bernoulli projection matrix to compress the data 106a-n belonging to the respective data provider 102a-n along a sample-wise dimension. At 802, a dataset may be compressed by applying a first random matrix. The dataset is owned by a party (e.g., data provider 102a) among a plurality of parties (e.g., data providers 102a-n). There may be a plurality of datasets owned by the plurality of parties. The first random matrix may be a Bernoulli projection matrix. The elements of the Bernoulli projection matrix may include independent random variables Aij sampled from a distribution, wherein Aij is equal to positive one with a probability of ½ % and wherein Aij is equal to negative one with a probability of ½. The first random matrix may be shared among the plurality of parties for compressing their respective datasets.

After compressing the dataset, Gaussian noise made be added to the compressed data. At 804, a noise may be added by applying a random Gaussian matrix to the compressed dataset to obtain a processed dataset. The random Gaussian matrix may comprise elements sampled from a Gaussian distribution with mean 0 and variance of $4d\sigma_{\epsilon,\delta}^2$. The processed dataset ensures data privacy protection. For example, the processed dataset may satisfy $(\epsilon,\delta)$-differential privacy. The processed dataset may be denoted by $(D^{rmgm})^j$, and wherein $(D_{rmgm})^j$ is equal to a dot product of one divided by a square root of k and $AD^j$ plus $R^j$, and wherein k represents a dimension of the compressed dataset, A represents the first random matrix, $D^j$, $j=1 \ldots m$, represents the dataset owned by the party among the plurality of m parties, $m \geq 2$, and $R^j$ represents the random Gaussian matrix applied to the dataset.

At 806, the processed dataset may be released to other parties. The other parties may be from the plurality of parties or may be different parties. Once released to other parties, the other parties may utilize the data without being able to infer the attributes or identity of any individual data sample. For example, the other parties may utilize the data to train one or more machine learning models.

Figure 9:
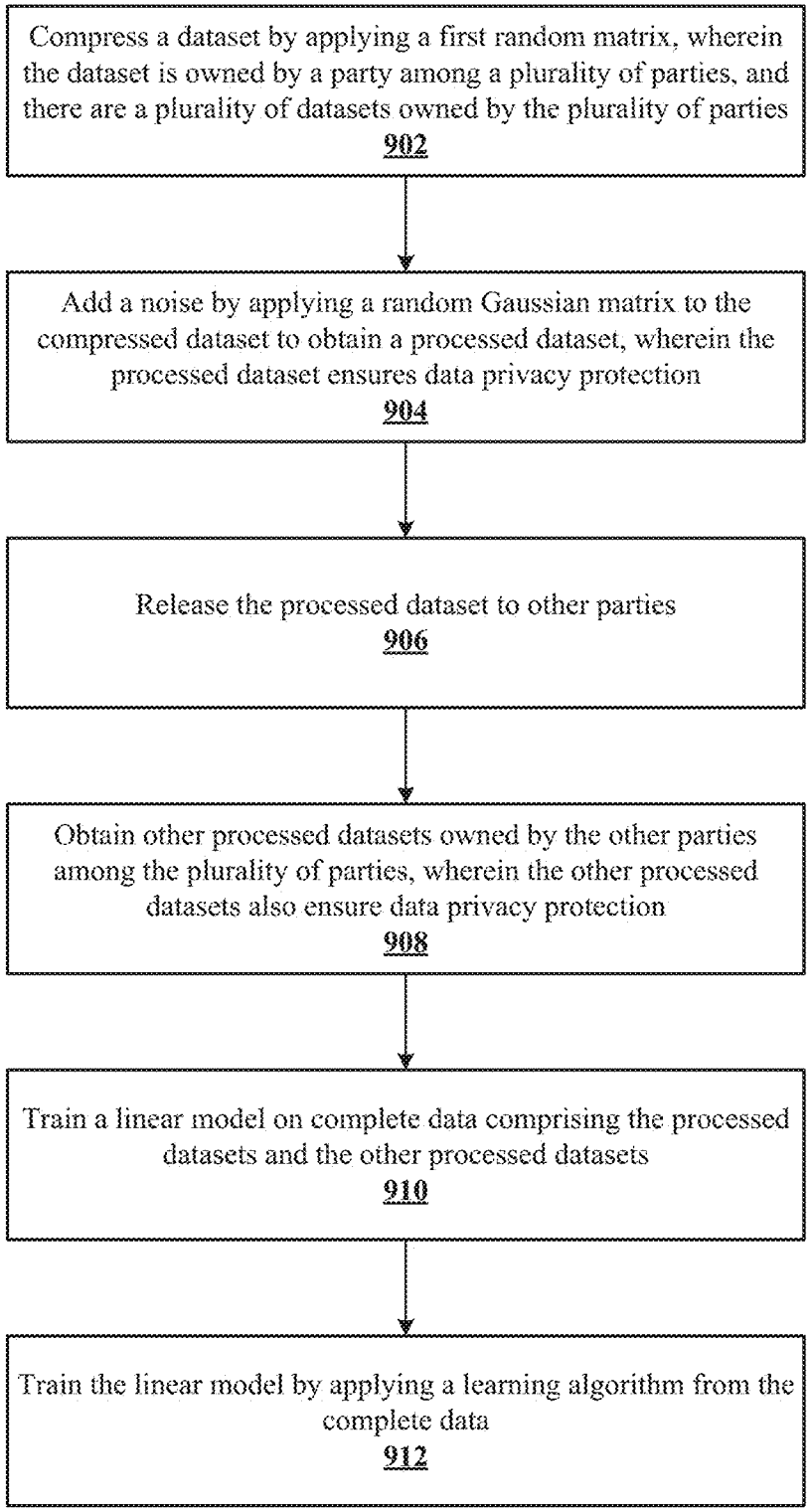
FIG. 9 shows another example process for differentially private data release.

FIG. 9 illustrates an example process 900 performed by a differential privacy model (e.g., differential privacy model 202a-n). The differential privacy model may perform the process 900 to perform the second improved DP algorithm described above. Although depicted as a sequence of operations in FIG. 9, those of ordinary skill in the art will appreciate that various embodiments may add, remove, reorder, or modify the depicted operations.

As described above, the first improved DP algorithm is a De-biased Gaussian Mechanism for Ordinary Least Squares (DGM-OLS). To perform the first DP algorithm, the differential privacy models 202a-n may add Gaussian noise directly to data 106a-n belonging to the respective data provider 102a-n. For example, the differential privacy model 202a may add Gaussian noise directly to data 106a belonging to the data provider 102a, etc. At 702, noise may be added by applying a random Gaussian matrix to a dataset to obtain a processed dataset. The dataset is owned by a party (e.g., a data provider 102a) among a plurality of parties (e.g., data providers 102a-n). There may be a plurality of datasets owned by the plurality of parties. The processed dataset ensures data privacy protection After adding Gaussian noise to the dataset, the differential privacy models 202a-n may continue to perform the first DP algorithm by removing certain biases from the resulting Hessian matrix. At 704, at least one bias may be removed from the processed dataset. After the bias(es) are removed, the processed dataset is ready to be released to other parties (e.g., other data providers 102a-n). For example, the processed dataset may satisfy $(\epsilon,\delta)$-differential privacy. At 706, the processed dataset may be released to other parties. The other parties may be from the plurality of parties, or may be different parties. Once released to other parties, the other parties may utilize the data without being able to infer the attributes or identity of any individual data sample. For example, the other parties may utilize the data to train one or more machine learning models.

FIG. 8 illustrates an example process 800 performed by a differential privacy model (e.g., differential privacy model 202a-n). The differential privacy model may perform the process 800 to perform the second improved DP algorithm described above. Although depicted as a sequence of operations in FIG. 8, those of ordinary skill in the art will appreciate that various embodiments may add, remove, reorder, or modify the depicted operations.

As described above, the second improved DP algorithm is a Random Mixing prior to Gaussian Mechanism for Ordinary Least Squares (RMGM-OLS). To perform the second DP algorithm, all of the differential privacy models 202a-n may utilize a shared Bernoulli projection matrix. All of the differential privacy models 202a-n may utilize the shared Bernoulli projection matrix to compress the data 106a-n belonging to the respective data provider 102a-n along a sample-wise dimension. At 902, a dataset may be compressed by applying a first random matrix. The dataset is owned by a party (e.g., data provider 102a) among a plurality of parties (e.g., data providers 102a-n). There may be a plurality of datasets owned by the plurality of parties. The first random matrix may be a Bernoulli projection matrix. The elements of the Bernoulli projection matrix may include independent random variables Aij sampled from a distribution, wherein Aij is equal to positive one with a probability of ½ and wherein Aij is equal to negative one with a probability of ½. The first random matrix may be shared among the plurality of parties for compressing their respective datasets.

After compressing the dataset, Gaussian noise made be added to the compressed data. At 904, a noise may be added by applying a random Gaussian matrix to the compressed dataset to obtain a processed dataset. The random Gaussian matrix may comprise elements sampled from a Gaussian distribution with mean 0 and variance of $4d\sigma_{\epsilon,\delta}^2$. The processed dataset ensures data privacy protection. For example, the processed dataset may satisfy $(\epsilon,\delta)$-differential privacy. The processed dataset may be denoted by $(D^{rmgm})^j$, and wherein $(D^{rmgm})^j$ is equal to a dot product of one divided by a square root of k and $AD^j$ plus $R^j$, and wherein k represents a dimension of the compressed dataset, A represents the first random matrix, $D^j$, j=1 . . . m, represents the dataset owned by the party among the plurality of m parties, m≥2, and $R^j$ represents the random Gaussian matrix applied to the dataset.

At 906, the processed dataset may be released to other parties. The other parties may be from the plurality of parties or may be different parties. Once released to other parties, the other parties may utilize the data without being able to infer the attributes or identity of any individual data sample. For example, the other parties may utilize the data to train one or more machine learning models.

At 908, other processed datasets owned by the other parties among the plurality of parties may be obtained. The other processed datasets also ensure data privacy protection. At 910, a linear model may be trained on complete data comprising the processed datasets and the other processed datasets. The linear model may be trained by applying a learning algorithm from the complete data. The learning algorithm from the complete data may be denoted as $A_2^{rmgm}(D^{rmgm})$, and wherein $A_2^{rmgm}(D^{rmgm})$ is equal to one divided by n, multiplied by one divided by $\hat{H}_n^{rmgm}$, multiplied by a transpose of $X^{rmgm}$, multiplied by $Y^{rmgm}$, and wherein $D^{rmgm}$ represents a collection of all processed datasets, n represents a size of a dataset $\hat{H}_n^{rmgm}$, $\hat{H}_{nR}^{rmgm}$ is equal to one divided by n, multiplied by a transpose of $X^{rmgm}$, multiplied by $X^{rmgm}$, $X^{rmgm}$ represents a feature matrix from the processed datasets, and $Y^{rmgm}$ represents label vectors from the processed datasets.

Many recent works study differentially private data release algorithms. However, those algorithms either only serve for data release from a single-party, or focus on the feature dimension reduction or empirical improvement, which is orthogonal to the study of asymptotical optimality with respect to dataset size. The random Gaussian projection matrices in these methods contribute to the differential privacy guarantee, hence the sharing of a projection matrix would violate the privacy guarantee between parties. Nevertheless, without sharing this projection matrix, the utility cannot be guaranteed. These methods may train a differentially private GAN. However, it is not obvious to privately share data information during their training when each party holds different attributes but same instances. These methods propose a random mixing method and also analyze the linear model. However, they mix only works for realizable linear data, and this is not able to be extended to the general linear regression and the asymptotic optimality guarantee. Some of these methods focus on feature dimension reduction, which is orthogonal to the study of asymptotical optimality with respect to dataset size.

A large amount of works study differentially private optimization for convex problems or for linear regression. However, they mainly differ from the techniques described herein in the sense that their goal is to release the final model while the goal of the techniques described herein is to release the dataset.

Linear regression is a fundamental machine learning task, and there have been some works studying linear regression over vertically partitioned datasets based on secure multi-party computation. However, cryptographic protocols such as Homomorphic Encryption and garbled circuits lead to heavy overhead on computation and communication. From this aspect, DP-based techniques are more practical.

In conclusion, the techniques described herein involve two differentially private algorithms under a multi-party setting for linear regression. Each solution is asymptotically optimal with increasing dataset size. It is empirically verified that the second DP algorithm described herein has the best performance on both synthetic datasets and real-world datasets. While the techniques described herein focus on linear regression only, it should be appreciated that the techniques described herein could instead be extended to classification, e.g., logistic regression, while achieving the same asymptotic optimality. In addition, while the techniques described herein assume that different parties (e.g., different data providers) own the same set of data subjects, it should be appreciated that in some embodiments, the set of subjects owned by different parties might be slightly different.

Figure 10:
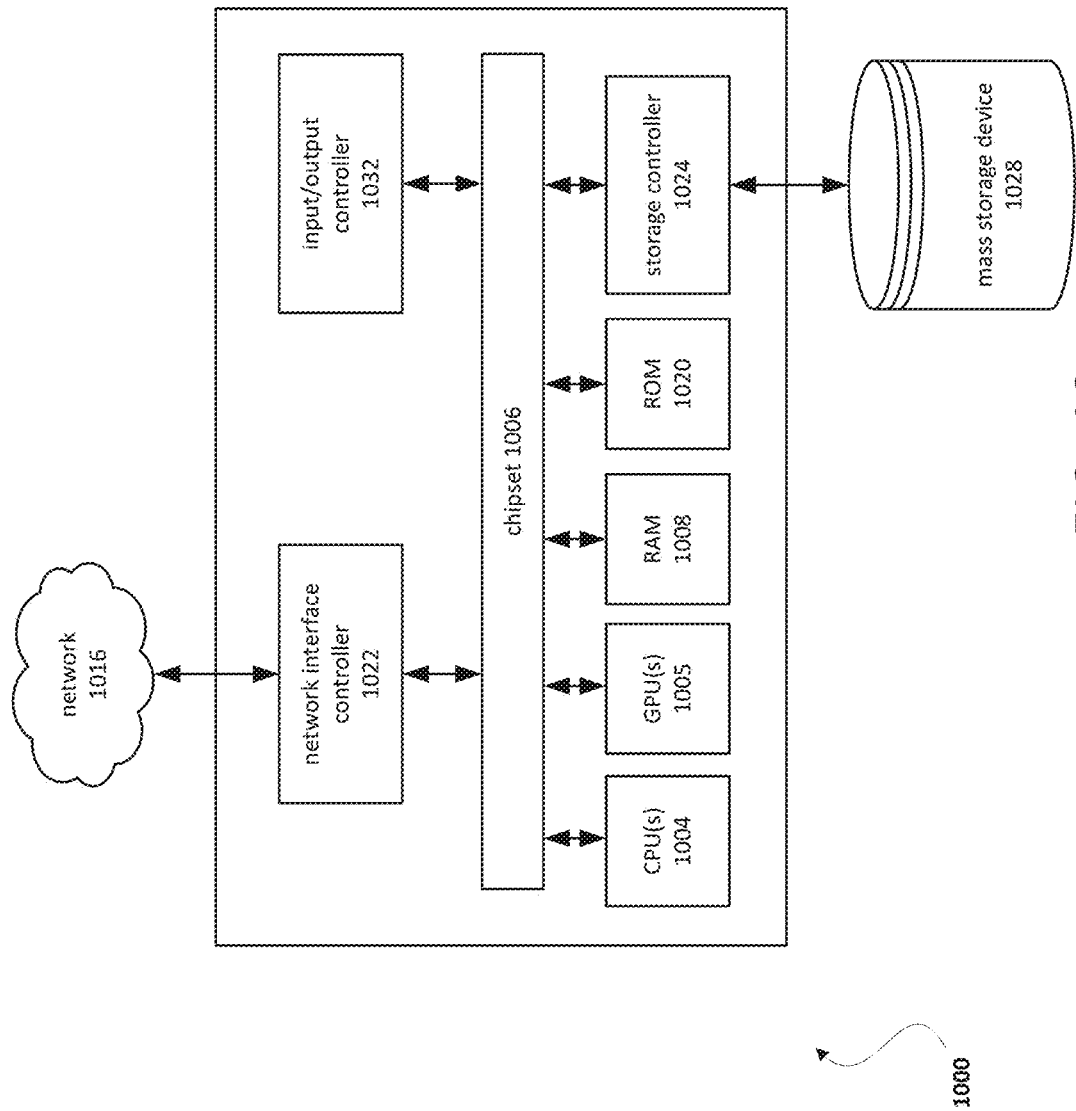
FIG. 10 shows an example computing device which may be used to perform any of the techniques disclosed herein.

FIG. 10 illustrates a computing device that may be used in various aspects, such as the networks, models, and/or devices depicted in FIG. 2. With regard to the example architecture of FIG. 2, the data providers 102a-n, the differential privacy models 202a-n, the network 120, and/or the computing devices 116a-n may each be implemented by one or more instance of a computing device 1000 of FIG. 10. The computer architecture shown in FIG. 10 shows a conventional server computer, workstation, desktop computer, laptop, tablet, network appliance, PDA, e-reader, digital cellular phone, or other computing node, and may be utilized to execute any aspects of the computers described herein, such as to implement the methods described herein.

The computing device 1000 may include a baseboard, or "motherboard," which is a printed circuit board to which a multitude of components or devices may be connected by way of a system bus or other electrical communication paths. One or more central processing units (CPUs) 1004 may operate in conjunction with a chipset 1006. The CPU(s)

1004 may be standard programmable processors that perform arithmetic and logical operations necessary for the operation of the computing device 1000.

The CPU(s) 1004 may perform the necessary operations by transitioning from one discrete physical state to the next through the manipulation of switching elements that differentiate between and change these states. Switching elements may generally include electronic circuits that maintain one of two binary states, such as flip-flops, and electronic circuits that provide an output state based on the logical combination of the states of one or more other switching elements, such as logic gates. These basic switching elements may be combined to create more complex logic circuits including registers, adders-subtractors, arithmetic logic units, floating-point units, and the like.

The CPU(s) 1004 may be augmented with or replaced by other processing units, such as GPU(s) 1005. The GPU(s) 1005 may comprise processing units specialized for but not necessarily limited to highly parallel computations, such as graphics and other visualization-related processing.

A chipset 1006 may provide an interface between the CPU(s) 1004 and the remainder of the components and devices on the baseboard. The chipset 1006 may provide an interface to a random-access memory (RAM) 1008 used as the main memory in the computing device 1000. The chipset 1006 may further provide an interface to a computer-readable storage medium, such as a read-only memory (ROM) 1020 or non-volatile RAM (NVRAM) (not shown), for storing basic routines that may help to start up the computing device 1000 and to transfer information between the various components and devices. ROM 1020 or NVRAM may also store other software components necessary for the operation of the computing device 1000 in accordance with the aspects described herein.

The computing device 1000 may operate in a networked environment using logical connections to remote computing nodes and computer systems through local area network (LAN). The chipset 1006 may include functionality for providing network connectivity through a network interface controller (NIC) 1022, such as a gigabit Ethernet adapter. A NIC 1022 may be capable of connecting the computing device 1000 to other computing nodes over a network 1016. It should be appreciated that multiple NICs 1022 may be present in the computing device 1000, connecting the computing device to other types of networks and remote computer systems.

The computing device 1000 may be connected to a mass storage device 1028 that provides non-volatile storage for the computer. The mass storage device 1028 may store system programs, application programs, other program modules, and data, which have been described in greater detail herein. The mass storage device 1028 may be connected to the computing device 1000 through a storage controller 1024 connected to the chipset 1006. The mass storage device 1028 may consist of one or more physical storage units. The mass storage device 1028 may comprise a management component 1010. A storage controller 1024 may interface with the physical storage units through a serial attached SCSI (SAS) interface, a serial advanced technology attachment (SATA) interface, a fiber channel (FC) interface, or other type of interface for physically connecting and transferring data between computers and physical storage units.

The computing device 1000 may store data on the mass storage device 1028 by transforming the physical state of the physical storage units to reflect the information being stored. The specific transformation of a physical state may depend on various factors and on different implementations of this description. Examples of such factors may include, but are not limited to, the technology used to implement the physical storage units and whether the mass storage device 1028 is characterized as primary or secondary storage and the like.

For example, the computing device 1000 may store information to the mass storage device 1028 by issuing instructions through a storage controller 1024 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computing device 1000 may further read information from the mass storage device 1028 by detecting the physical states or characteristics of one or more particular locations within the physical storage units.

In addition to the mass storage device 1028 described above, the computing device 1000 may have access to other computer-readable storage media to store and retrieve information, such as program modules, data structures, or other data. It should be appreciated by those skilled in the art that computer-readable storage media may be any available media that provides for the storage of non-transitory data and that may be accessed by the computing device 1000.

By way of example and not limitation, computer-readable storage media may include volatile and non-volatile, transitory computer-readable storage media and non-transitory computer-readable storage media, and removable and non-removable media implemented in any method or technology. Computer-readable storage media includes, but is not limited to, RAM, ROM, erasable programmable ROM ("EPROM"), electrically erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage, other magnetic storage devices, or any other medium that may be used to store the desired information in a non-transitory fashion.

A mass storage device, such as the mass storage device 1028 depicted in FIG. 10, may store an operating system utilized to control the operation of the computing device 1000. The operating system may comprise a version of the LINUX operating system. The operating system may comprise a version of the WINDOWS SERVER operating system from the MICROSOFT Corporation. According to further aspects, the operating system may comprise a version of the UNIX operating system. Various mobile phone operating systems, such as IOS and ANDROID, may also be utilized. It should be appreciated that other operating systems may also be utilized. The mass storage device 1028 may store other system or application programs and data utilized by the computing device 1000.

The mass storage device 1028 or other computer-readable storage media may also be encoded with computer-executable instructions, which, when loaded into the computing device 1000, transforms the computing device from a general-purpose computing system into a special-purpose computer capable of implementing the aspects described herein. These computer-executable instructions transform the computing device 1000 by specifying how the CPU(s) 1004 transition between states, as described above. The computing device 1000 may have access to computer-readable storage media storing computer-executable instructions, which, when executed by the computing device 1000, may perform the methods described herein.

A computing device, such as the computing device 1000 depicted in FIG. 10, may also include an input/output controller 1032 for receiving and processing input from a number of input devices, such as a keyboard, a mouse, a touchpad, a touch screen, an electronic stylus, or other type of input device. Similarly, an input/output controller 1032 may provide output to a display, such as a computer monitor, a flat-panel display, a digital projector, a printer, a plotter, or other type of output device. It will be appreciated that the computing device 1000 may not include all of the components shown in FIG. 10, may include other components that are not explicitly shown in FIG. 10, or may utilize an architecture completely different than that shown in FIG. 10.

As described herein, a computing device may be a physical computing device, such as the computing device 1000 of FIG. 10. A computing node may also include a virtual machine host process and one or more virtual machine instances. Computer-executable instructions may be executed by the physical hardware of a computing device indirectly through interpretation and/or execution of instructions stored and executed in the context of a virtual machine.

It is to be understood that the methods and systems are not limited to specific methods, specific components, or to particular implementations. It is also to be understood that the terminology used herein is for the purpose of describing particular embodiments only and is not intended to be limiting.

As used in the specification and the appended claims, the singular forms "a," "an," and "the" include plural referents unless the context clearly dictates otherwise. Ranges may be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

"Optional" or "optionally" means that the subsequently described event or circumstance may or may not occur, and that the description includes instances where said event or circumstance occurs and instances where it does not.

Throughout the description and claims of this specification, the word "comprise" and variations of the word, such as "comprising" and "comprises," means "including but not limited to," and is not intended to exclude, for example, other components, integers or steps. "Exemplary" means "an example of" and is not intended to convey an indication of a preferred or ideal embodiment. "Such as" is not used in a restrictive sense, but for explanatory purposes.

Components are described that may be used to perform the described methods and systems. When combinations, subsets, interactions, groups, etc., of these components are described, it is understood that while specific references to each of the various individual and collective combinations and permutations of these may not be explicitly described, each is specifically contemplated and described herein, for all methods and systems. This applies to all aspects of this application including, but not limited to, operations in described methods. Thus, if there are a variety of additional operations that may be performed it is understood that each of these additional operations may be performed with any specific embodiment or combination of embodiments of the described methods.

The present methods and systems may be understood more readily by reference to the following detailed description of preferred embodiments and the examples included therein and to the Figures and their descriptions.

As will be appreciated by one skilled in the art, the methods and systems may take the form of an entirely hardware embodiment, an entirely software embodiment, or an embodiment combining software and hardware aspects. Furthermore, the methods and systems may take the form of a computer program product on a computer-readable storage medium having computer-readable program instructions (e.g., computer software) embodied in the storage medium. More particularly, the present methods and systems may take the form of web-implemented computer software. Any suitable computer-readable storage medium may be utilized including hard disks, CD-ROMs, optical storage devices, or magnetic storage devices.

Embodiments of the methods and systems are described below with reference to block diagrams and flowchart illustrations of methods, systems, apparatuses and computer program products. It will be understood that each block of the block diagrams and flowchart illustrations, and combinations of blocks in the block diagrams and flowchart illustrations, respectively, may be implemented by computer program instructions. These computer program instructions may be loaded on a general-purpose computer, special-purpose computer, or other programmable data processing apparatus to produce a machine, such that the instructions which execute on the computer or other programmable data processing apparatus create a means for implementing the functions specified in the flowchart block or blocks.

These computer program instructions may also be stored in a computer-readable memory that may direct a computer or other programmable data processing apparatus to function in a particular manner, such that the instructions stored in the computer-readable memory produce an article of manufacture including computer-readable instructions for implementing the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide steps for implementing the functions specified in the flowchart block or blocks.

The various features and processes described above may be used independently of one another, or may be combined in various ways. All possible combinations and sub-combinations are intended to fall within the scope of this disclosure. In addition, certain methods or process blocks may be omitted in some implementations. The methods and processes described herein are also not limited to any particular sequence, and the blocks or states relating thereto may be performed in other sequences that are appropriate. For example, described blocks or states may be performed in an order other than that specifically described, or multiple blocks or states may be combined in a single block or state. The example blocks or states may be performed in serial, in parallel, or in some other manner. Blocks or states may be added to or removed from the described example embodiments. The example systems and components described herein may be configured differently than described. For example, elements may be added to, removed from, or rearranged compared to the described example embodiments.

It will also be appreciated that various items are illustrated as being stored in memory or on storage while being used, and that these items or portions thereof may be transferred between memory and other storage devices for purposes of memory management and data integrity. Alternatively, in other embodiments, some or all of the software modules and/or systems may execute in memory on another device and communicate with the illustrated computing systems via inter-computer communication. Furthermore, in some embodiments, some or all of the systems and/or modules may be implemented or provided in other ways, such as at least partially in firmware and/or hardware, including, but not limited to, one or more application-specific integrated circuits ("ASICs"), standard integrated circuits, controllers (e.g., by executing appropriate instructions, and including microcontrollers and/or embedded controllers), field-programmable gate arrays ("FPGAs"), complex programmable logic devices ("CPLDs"), etc. Some or all of the modules, systems, and data structures may also be stored (e.g., as software instructions or structured data) on a computer-readable medium, such as a hard disk, a memory, a network, or a portable media article to be read by an appropriate device or via an appropriate connection. The systems, modules, and data structures may also be transmitted as generated data signals (e.g., as part of a carrier wave or other analog or digital propagated signal) on a variety of computer-readable transmission media, including wireless-based and wired/cable-based media, and may take a variety of forms (e.g., as part of a single or multiplexed analog signal, or as multiple discrete digital packets or frames). Such computer program products may also take other forms in other embodiments. Accordingly, the present invention may be practiced with other computer system configurations.

While the methods and systems have been described in connection with preferred embodiments and specific examples, it is not intended that the scope be limited to the particular embodiments set forth, as the embodiments herein are intended in all respects to be illustrative rather than restrictive.

Unless otherwise expressly stated, it is in no way intended that any method set forth herein be construed as requiring that its operations be performed in a specific order. Accordingly, where a method claim does not actually recite an order to be followed by its operations or it is not otherwise specifically stated in the claims or descriptions that the operations are to be limited to a specific order, it is no way intended that an order be inferred, in any respect. This holds for any possible non-express basis for interpretation, including: matters of logic with respect to arrangement of steps or operational flow; plain meaning derived from grammatical organization or punctuation; and the number or type of embodiments described in the specification.

It will be apparent to those skilled in the art that various modifications and variations may be made without departing from the scope or spirit of the present disclosure. Other embodiments will be apparent to those skilled in the art from consideration of the specification and practices described herein. It is intended that the specification and example figures be considered as exemplary only, with a true scope and spirit being indicated by the following claims.

What is claimed is:

1. A method of releasing data while protecting individual privacy, comprising:

compressing a dataset to a lowered dimension space by a differential privacy model utilizing a first random matrix, wherein the dataset is owned by a respective data provider among the plurality of data providers, wherein there are a plurality of datasets owned by the plurality of data providers, wherein the first random matrix is shared among the plurality of data providers, and wherein each of the plurality of data providers includes the differential privacy model for processing their respective datasets;

adding a noise by applying a random Gaussian matrix to the compressed dataset to obtain a processed dataset, wherein the random Gaussian matrix comprises elements sampled from a Gaussian distribution with mean 0 and variance of $4d\sigma_{\epsilon,\delta}$, to implement $(\epsilon, \delta)$-differential privacy, wherein the processed dataset ensures data privacy protection; and releasing the processed dataset while protecting individual privacy of the dataset from exposure, wherein a party of receiving the processed dataset is unable to infer attributes or identity of any individual data sample.

2. The method of claim 1, wherein the first random matrix is a Bernoulli projection matrix, and wherein the Bernoulli projection matrix comprises independent random variables $A_{ij}$ sampled from a distribution $$Aij = \begin{cases} +1 & \text{with probability } 1/2 \\ -1 & \text{with probability } 1/2 \end{cases}.$$

3. The method of claim 1, wherein the processed dataset is denoted by $(D^{rmgm})^i$, and wherein $(D^{rmgm})^i$ is equal to $$\frac{1}{\sqrt{k}} \cdot AD^j + R^j,$$

and wherein k represents a dimension of the compressed dataset, A represents the first random matrix, $D^i$, j=1 ... m, represents the dataset owned by the respective data provider among the plurality of m data providers, m≥2, and $R^j$ represents the random Gaussian matrix applied to the dataset.

4. The method of claim 1, further comprising:

obtaining other processed datasets owned by other data providers among the plurality of data providers, wherein the other processed datasets also ensure data privacy protection; and training a linear model on complete data comprising the processed dataset and the other processed datasets.

5. The method of claim 4, further comprising:

training the linear model by applying a learning algorithm from the complete data, wherein the learning algorithm from the complete data is denoted as $A_2^{rmgm}(D^{rmgm})$, wherein $A_2^{rmmgm}(D^{rmgm})$ is defined as $$A_2^{rmgm}(D^{rmgm}) = \frac{1}{n}(\hat{H}_n^{rmgm})^{-1}(X^{rmgm})^T Y^{rmgm},$$

wherein $D^{rmgm}$ represents a collection of all processed datasets, n represents a size of the complete data, $$\hat{H}_n^{rmgm} := \frac{1}{n}(X^{rmgm})^T X^{rmgm},$$

$X^{rmgm}$ represents a feature matrix from the processed datasets, and $Y^{rmgm}$ represents label vectors from the processed datasets.

6. A system of implementing data privacy protection, comprising:
  at least one processor; and
  at least one memory communicatively coupled to the at least one processor and storing instructions that upon execution by the at least one processor cause the system to perform operations, the operations comprising:
  compressing a dataset to a lowered dimension space by a differential privacy model utilizing a first random matrix, wherein the dataset is owned by a respective data provider among the plurality of data providers, wherein there are a plurality of datasets owned by the plurality of data providers, wherein the first random matrix is shared among the plurality of data providers, and wherein each of the plurality of data providers includes the differential privacy model for processing their respective datasets;
  adding a noise by applying a random Gaussian matrix to the compressed dataset to obtain a processed dataset, wherein the random Gaussian matrix comprises elements sampled from a Gaussian distribution with mean 0 and variance of $4d\sigma^2_{\epsilon,\delta}$, to implement $(\epsilon, \delta)$-differential privacy, wherein the processed dataset ensures data privacy protection; and
  releasing the processed dataset while protecting individual privacy of the dataset from exposure, wherein a party of receiving the processed dataset is unable to infer attributes or identity of any individual data sample.

7. The system of claim 6, wherein the first random matrix is a Bernoulli projection matrix, and wherein the Bernoulli projection matrix comprises independent random variables $A_{ij}$ sampled from a distribution $$Aij = \begin{cases} +1 & \text{with probability } 1/2 \\ -1 & \text{with probability } 1/2 \end{cases}.$$

8. The system of claim 6, wherein the processed dataset is denoted by $(D^{rmgm})^i$, and wherein $(D^{rmgm})^i$ is equal to $$\frac{1}{\sqrt{k}} \cdot AD^j + R^j,$$

and wherein k represents a dimension of the compressed dataset, A represents the first random matrix, $D^i$, j=1 ... m, represents the dataset owned by the respective data provider among the plurality of m data providers, m≥2, and $R^j$ represents the random Gaussian matrix applied to the dataset.

9. The system of claim 6, the operations further comprising:
  obtaining other processed datasets owned by other data providers among the plurality of data providers, wherein the other processed datasets also ensure data privacy protection; and
  training a linear model on complete data comprising the processed dataset and the other processed datasets.

10. The system of claim 9, the operations further comprising:
  training the linear model by applying a learning algorithm from the complete data, wherein the learning algorithm from the complete data is denoted as $A_2^{rmgm}(D^{rmgm})$, wherein $A_2^{rmgm}(D^{rmgm})$ is defined as $$A_2^{rmgm}(D^{rmgm}) = \frac{1}{n}(\hat{H}_n^{rmgm})^{-1}(X^{rmgm})^T Y^{rmgm},$$

wherein $D^{rmgm}$ represents a collection of all processed datasets, n represents a size of the complete data, $$\hat{H}_n^{rmgm} := \frac{1}{n}(X^{rmgm})^T X^{rmgm},$$

$X^{rmgm}$ represents a feature matrix from the processed datasets, and $Y^{rmgm}$ represents label vectors from the processed datasets.

11. A non-transitory computer-readable storage medium, storing computer-readable instructions that upon execution by a processor cause the processor to implement operations, the operation comprising:
  compressing a dataset to a lowered dimension space by a differential privacy model utilizing a first random matrix, wherein the dataset is owned by a respective data provider among the plurality of data providers, wherein there are a plurality of datasets owned by the plurality of data providers, wherein the first random matrix is shared among the plurality of data providers, and wherein each of the plurality of data providers includes the differential privacy model for processing their respective datasets;
  adding a noise by applying a random Gaussian matrix to the compressed dataset to obtain a processed dataset, wherein the random Gaussian matrix comprises elements sampled from a Gaussian distribution with mean 0 and variance of $4d\sigma^2_{\epsilon,\delta}$, to implement $(\epsilon, \delta)$-differential privacy, wherein the processed dataset ensures data privacy protection; and
  releasing the processed dataset while protecting individual privacy of the dataset from exposure, wherein a party of receiving the processed dataset is unable to infer attributes or identity of any individual data sample.

12. The non-transitory computer-readable storage medium of claim 11, wherein the first random matrix is a Bernoulli projection matrix.

13. The non-transitory computer-readable storage medium of claim 11, wherein the processed dataset is denoted by $(D^{rmgm})^i$, and wherein $(D^{rmgm})^i$ is equal to $$\frac{1}{\sqrt{k}} \cdot AD^j + R^j,$$

and wherein k represents a dimension of the compressed dataset, A represents the first random matrix, $D^i$, j=1 ... m, represents the dataset owned by the respective data provider among the plurality of m data providers, m≥2, and $R^j$ represents the random Gaussian matrix applied to the dataset.

14. The non-transitory computer-readable storage medium of claim 11, the operations further comprising:
  obtaining other processed datasets owned by other data providers among the plurality of data providers parties, wherein the other processed datasets also ensure data privacy protection; and
  training a linear model on complete data comprising the processed dataset and the other processed datasets.

15. The non-transitory computer-readable storage medium of claim 14, the operations further comprising:
  training the linear model by applying a learning algorithm from the complete data, wherein the learning algorithm from the complete data is denoted as $A_2^{rmgm}(D^{rmgm})$, wherein $A_2^{rmgm}(D^{rmgm})$ is defined as $$A_2^{rmgm}(D^{rmgm}) = \frac{1}{n}(\hat{H}_n^{rmgm})^{-1}(X^{rmgm})^T Y^{rmgm},$$

wherein $D^{rmgm}$ represents a collection of all processed datasets, n represents a size of the complete data, $$\hat{H}_n^{rmgm} := \frac{1}{n}(X^{rmgm})^T X^{rmgm},$$

$X^{rmgm}$ represents a feature matrix from the processed datasets, and $Y^{rmgm}$ represents label vectors from the processed datasets.

* * * * *